US010313538B2

(12) United States Patent
Yun et al.

(10) Patent No.: US 10,313,538 B2
(45) Date of Patent: Jun. 4, 2019

(54) IMAGE FORMING APPARATUS AND SCANNING METHOD BY IMAGE FORMING APPARATUS FOR COMBINING SEPARATELY SCANNED DOCUMENTS

(71) Applicant: HP PRINTING KOREA CO., LTD., Suwon-si, Gyeonggi-do (KR)

(72) Inventors: Tae-jung Yun, Seoul (KR); Yong-im Kim, Seoul (KR); Hong-seock Kim, Suwon-si (KR)

(73) Assignee: HP Printing Korea Co., Ltd., Suwon-si (KR)

( * ) Notice: Subject to any disclaimer, the term of this patent is extended or adjusted under 35 U.S.C. 154(b) by 0 days.

(21) Appl. No.: 15/314,040

(22) PCT Filed: Dec. 2, 2014

(86) PCT No.: PCT/KR2014/011671
§ 371 (c)(1),
(2) Date: Nov. 25, 2016

(87) PCT Pub. No.: WO2015/182839
PCT Pub. Date: Dec. 3, 2015

(65) Prior Publication Data
US 2017/0214808 A1 Jul. 27, 2017

(30) Foreign Application Priority Data
May 29, 2014 (KR) .................... 10-2014-0065052

(51) Int. Cl.
*H04N 1/00* (2006.01)
*H04N 1/32* (2006.01)
(Continued)

(52) U.S. Cl.
CPC .......... *H04N 1/00228* (2013.01); *G06F 3/12* (2013.01); *G06F 3/124* (2013.01); *H04N 1/0022* (2013.01);
(Continued)

(58) Field of Classification Search
CPC ............. H04N 1/00228; H04N 1/0022; H04N 1/32475; H04N 1/2346; H04N 2201/33378; H04N 2201/0094
(Continued)

(56) References Cited

U.S. PATENT DOCUMENTS 4,951,132 A * 8/1990 Nakade ................ H04N 1/3875
358/524
7,978,359 B2 7/2011 Koarai
(Continued)

FOREIGN PATENT DOCUMENTS

EP 2364009 A2 9/2011
JP 2005176191 A 6/2005
(Continued)

*Primary Examiner* — Benny Q Tieu
*Assistant Examiner* — Juan M Guillermety
(74) *Attorney, Agent, or Firm* — Jefferson IP Law, LLP

(57) ABSTRACT

Disclosed is an image forming apparatus. The present image forming apparatus comprises: an input unit for receiving a scanning option; a communication unit for transmitting the received scanning option to another image forming apparatus; a scanning unit for scanning a first document according to the scanning option and generating first scanned data; and a control unit for receiving second scanned data in which a second document is scanned according to the scanning option in another image forming apparatus, and combining the first scanned data and the second scanned data.

14 Claims, 18 Drawing Sheets

(51) Int. Cl.
  *G06F 3/12* (2006.01)
  *H04N 1/387* (2006.01)
  *H04N 1/23* (2006.01)
(52) U.S. Cl.
  CPC ......... *H04N 1/2346* (2013.01); *H04N 1/3255* (2013.01); *H04N 1/32475* (2013.01); *H04N 1/32545* (2013.01); *H04N 1/387* (2013.01); *H04N 2201/0094* (2013.01); *H04N 2201/33378* (2013.01)
(58) Field of Classification Search
  USPC ............................... 358/1.14, 1.15, 450, 540
  See application file for complete search history.

(56) References Cited

U.S. PATENT DOCUMENTS

| | | | |
|---|---|---|---|
| 8,351,074 | B2 | 1/2013 | Naito et al. |
| 8,390,854 | B2* | 3/2013 | Ito ...................... H04N 1/32502 |
| | | | 358/1.15 |
| 8,514,438 | B2 | 8/2013 | Nishio |
| 8,797,571 | B2 | 8/2014 | Kong |
| 2003/0133146 | A1 | 7/2003 | Parry |
| 2006/0050294 | A1 | 3/2006 | Smith et al. |
| 2006/0050310 | A1 | 3/2006 | Ito |
| 2007/0076237 | A1 | 4/2007 | Kudo |
| 2008/0180725 | A1 | 7/2008 | Levin |
| 2010/0005159 | A1* | 1/2010 | Ishiguro ............. H04N 1/32037 |
| | | | 709/221 |
| 2010/0014112 | A1 | 1/2010 | Yoshida |
| 2010/0231982 | A1 | 9/2010 | Mihira |
| 2011/0194138 | A1* | 8/2011 | Seo .................... H04N 1/00204 |
| | | | 358/1.15 |
| 2012/0069391 | A1 | 3/2012 | Yonezawa et al. |
| 2013/0057917 | A1* | 3/2013 | Ohta .................. H04N 1/00347 |
| | | | 358/1.15 |
| 2013/0176865 | A1* | 7/2013 | Boland ............... H04L 47/2483 |
| | | | 370/252 |
| 2013/0188212 | A1* | 7/2013 | Pardhan ............. H04N 1/00222 |
| | | | 358/1.15 |
| 2014/0128047 | A1* | 5/2014 | Edwards .............. H04W 12/08 |
| | | | 455/415 |

FOREIGN PATENT DOCUMENTS

| | | |
|---|---|---|
| JP | 4107317 B2 | 6/2008 |
| JP | 2008-186445 A | 8/2008 |
| JP | 2011-211303 A | 10/2011 |
| JP | 4799342 B2 | 10/2011 |
| JP | 2011-253409 A | 12/2011 |
| JP | 4887843 B2 | 2/2012 |
| JP | 2013-182467 A | 9/2013 |
| JP | 2013-190954 A | 9/2013 |
| KR | 10-2007-0043517 A | 4/2007 |
| KR | 10-2009-0002683 A | 1/2009 |
| KR | 10-0903135 B1 | 6/2009 |
| KR | 10-0988419 B1 | 10/2010 |
| KR | 10-2013-0060718 A | 6/2013 |

* cited by examiner

GENERATE COMBINED FILE

IMAGE FORMING APPARATUS AND SCANNING METHOD BY IMAGE FORMING APPARATUS FOR COMBINING SEPARATELY SCANNED DOCUMENTS

TECHNICAL FIELD

The present invention relates to an image forming apparatus and a scanning method thereof, and more particularly, to an image forming apparatus capable of performing distributing operation for each image forming apparatus by grouping a plurality of image forming apparatuses, and a scanning method thereof.

BACKGROUND

In general, an image forming apparatus refers to an apparatus which prints print data generated in a terminal device such as a computer on a recording paper. The examples of such image forming apparatus include a copier, printer, facsimile or multi function peripheral (MFP) which comprehensively realizes those functions through one device, etc.

There are cases where companies and public offices manage tens to thousands of image forming apparatuses. In such environment, a user may select a desired image forming apparatus to perform an operation.

For example, when there are a large amount of documents to be scanned or copied, the user may divide the documents and process them separately through multiple units of image forming apparatus, rather than processing all operations in one image forming apparatus.

However, in this case, there is a convenience that a user has to individually approach to a plurality of image forming apparatuses one by one to operate them. In particular, when scanning or copying, when there are a lot of options to be applied, a large amount of options has to be applied to apparatuses individually, thereby increasing inconvenience.

Also, in this case, the user has to combine the separately-performed operations into one, which is very inconvenient. For example, to combine scan image files generated from multiple image forming apparatuses, the user has to separately perform an operation of sequentially connecting image files by means of a host device. In addition, outputs outputted per each image forming apparatus have to be collected, which is very cumbersome.

Further, even if there are several image forming apparatuses, a device which supports a function desired by a user is only limited to some, and thus, a particular image forming apparatus has to perform many operations rather than a plurality of image forming apparatuses equally divide the workload.

DETAILED DESCRIPTION OF THE INVENTION

Purpose of the Invention

Accordingly, the purpose of the present invention is to provide an image forming apparatus capable of performing separate operation per each image forming apparatus by grouping a plurality of image forming apparatuses, and a scanning method thereof.

Means for Solving Problem

To achieve the aforementioned purpose, an image forming apparatus according to an exemplary embodiment includes an input unit configured to receive a scanning option, a communication unit configured to transmit the received scanning option to another image forming apparatus, a scanning unit configured to generate first scanned data by scanning first document according to the scanning option, and a control unit configured to receive, from the other image forming apparatus, second scanned data generated by second document according to the scanning option to combine the first scanned data with the second scanned data.

In this case, the control unit may combine the first scanned data and the second scanned data by aligning them according to a predetermined priority.

The control unit may convert the first scanned data and the second scanned data into a first scan image and a second scan image, respectively, and detect a page number displayed on each of the first and seconds can images to align the first scanned data and the second scanned data and combine them according to an order of the page numbers.

According to an embodiment, an image forming apparatus may further include an output unit configured to output the combined first and second scanned data onto a paper.

According to an embodiment, an image forming apparatus further includes a display configured to display a list of a plurality of image forming apparatuses connected to the image forming apparatus via network, wherein the another image forming apparatus may be selected from the list.

The control unit may, in response to the scanning option being individually set with respect to the first document and the second document, transmit a scanning option set with respect to the second document to the another image forming apparatus, and in response to the scanning option being collectively set with respect to the first document and the second document, transmit the entire input scanning option to the another image forming apparatus.

The control unit may transmit inherent state information of the image forming apparatus to the another image forming apparatus.

In this case, the innate state information may be a color temperature information of an image to be scanned in the image forming apparatus or color characteristic information of an image to be printed by the image forming apparatus.

The control unit may, in response to a fax transmission request being input with respect to the first document and the second document, transmit the scanning option and a fax transmission command with respect to the second document to the another image forming apparatus.

In this case, the control unit may, in response to the fax transmission request, convert the first scanned data into a signal having a fax-transmittable format to transmit the signal to a fax receipt node, and Transmit Terminal Identification (TTI) information of the image forming apparatus to the another image forming apparatus.

According to an embodiment, an image forming apparatus may further include a storage which stores a spam number registered in the image forming apparatus and in the another image forming apparatus, wherein the control unit may reject fax receipt in response to receiving a fax received from a number identical to the spam number stored in the storage.

According to an embodiment, a scanning method of an image forming apparatus includes receiving a scanning option, generating first scanned data by scanning a first document according to the scanning option, transmitting the received scanning option to another image forming apparatus, receiving, from the another image forming apparatus, second scanned data generated by scanning a second document according to the scanning option, and combining the first scanned data and the seconds scanned data.

The combining may include converting the first scanned data and the second scanned data into a first scan image and a second scan image, respectively, detecting a page number displayed on each of the first and second scan images, and aligning the first scanned data and the second scanned data and combining them according to an order of the page number.

According to an embodiment, a scanning method of an image forming apparatus may further include displaying a list of a plurality of image forming apparatuses connected to the image forming apparatus via network, wherein the another image forming apparatus may be selected from the list.

The transmitting the scanning option to the another image forming apparatus may include, in response to the scanning option being individually set with respect to the first document and the second document, transmit the scanning options et with respect to the second document to the another image forming apparatus, and in response to the scanning option being collectively set with respect to the first document and the second document, transmit the entire received scanning option to the another image forming apparatus.

The method may further include transmitting innate state information of the image forming apparatus to the another image forming apparatus.

In this case, the innate state information may be color temperature information of an image to be scanned in the image forming apparatus or color characteristic information to be printed in the image forming apparatus.

The transmitting the scanning option to the another image forming apparatus may include, in response to receiving a fax transmission request with respect to the first document and the second document, transmitting the scanning option and a fax transmission command with respect to the second document to the another image forming apparatus.

In this case, according to an embodiment, a scanning method of an image forming apparatus may further include, in response to the fax transmission request, converting the first scanned data into a signal having fax-transmittable format to transmit the converted data to a fax receipt node, and transmitting transmit terminal identification (TTI) information of the image forming apparatus to the another image forming apparatus.

According to an embodiment, a scanning method of an image forming apparatus may further include, in response to a fax received from a number that is identical to a spam number stored in the storage which stores a spam number respectively registered in the image forming apparatus and the another image forming apparatus, rejecting fax receipt.

According to the various embodiments, when performing operations separately through a plurality of image forming apparatuses, the present invention has the effect that each operation may be efficiently processed separately using only one image forming apparatus, rather than inputting an operation command with respect to a plurality of image forming apparatuses one by one.

PREFERRED EMBODIMENTS OF THE PRESENT DISCLOSURE

Hereinafter, the present invention will be described in more detail with reference to the accompanying drawings. In describing exemplary embodiments, detailed description of relevant known functions or components may be omitted if it would obscure the description of the subject matter.

Figure 1:
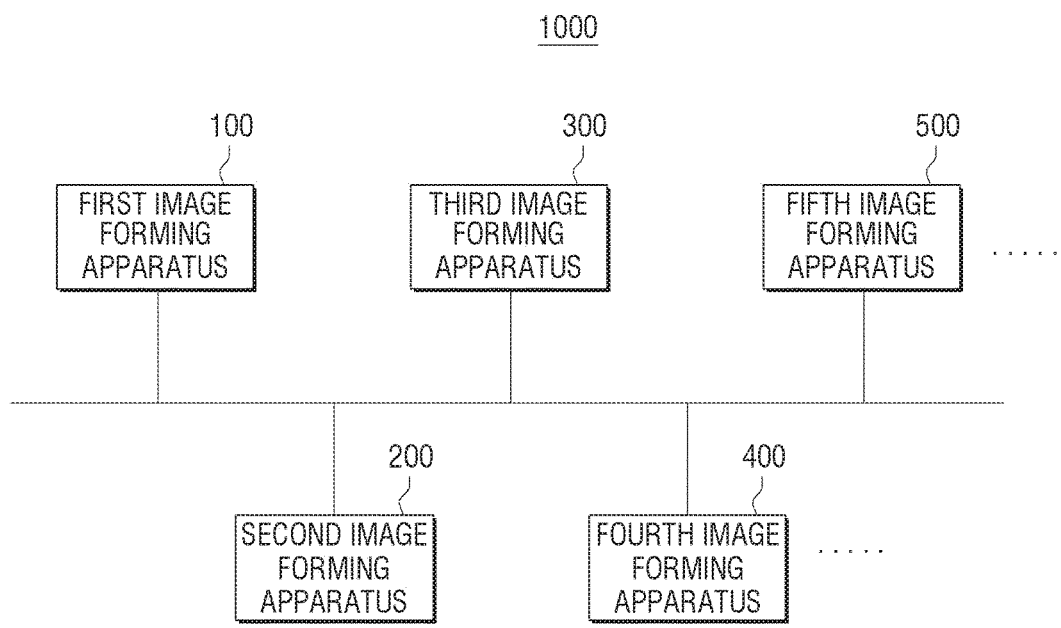
FIG. 1 illustrates an image forming system according to an embodiment of the present disclosure.

FIG. 1 is a view provided to explain an image forming system 1000 according to an embodiment of the present disclosure. Referring to FIG. 1, the present image forming system 1000 may include a plurality of image forming apparatuses 100-500 interconnected to perform a separate scanning job. For example, each of the plurality of image forming apparatuses 100-500 may be connected via local area network (LAN) or internet, or may be connected via a universal serial bus (USB).

In addition, each of the apparatuses may be directly connected to each other or may be indirectly connected to each other via router and other devices (e.g. server, etc.). Further, in the illustrated example, each of the apparatuses are connected to each other via cable; however, the connection may be realized wirelessly.

Each of the image forming apparatuses 100-500 is an apparatus which is capable of scanning a document such as a paper, an image, or a film, etc. to convert it into digital data. In this case, the digital data may be generated as an output image by being displayed on a computer monitor or by being printed in a printer. Each of the image forming apparatuses 100-500 may, for example, be realized as a scanning unit, a copier, a facsimile, or a multi function peripheral (MFP) which comprehensively realize the functions thereof through one device, etc.

In the present image forming system 1000, the plurality of image forming apparatuses 100-500 may be connected to each other to transmit or receive various data, and may divide a large amount of jobs to perform them. In other words, jobs such as scanning, sending or receiving fax, copying, etc. may be separately performed in a plurality of image forming apparatuses 100-500, and the separately performed jobs may be combined together as if the jobs were performed in a single device.

Hereinafter, various examples where a scanning job, a copying job, a fax job, etc. are separately performed in the present image forming system 1000 will be described one by one.

Figure 2:
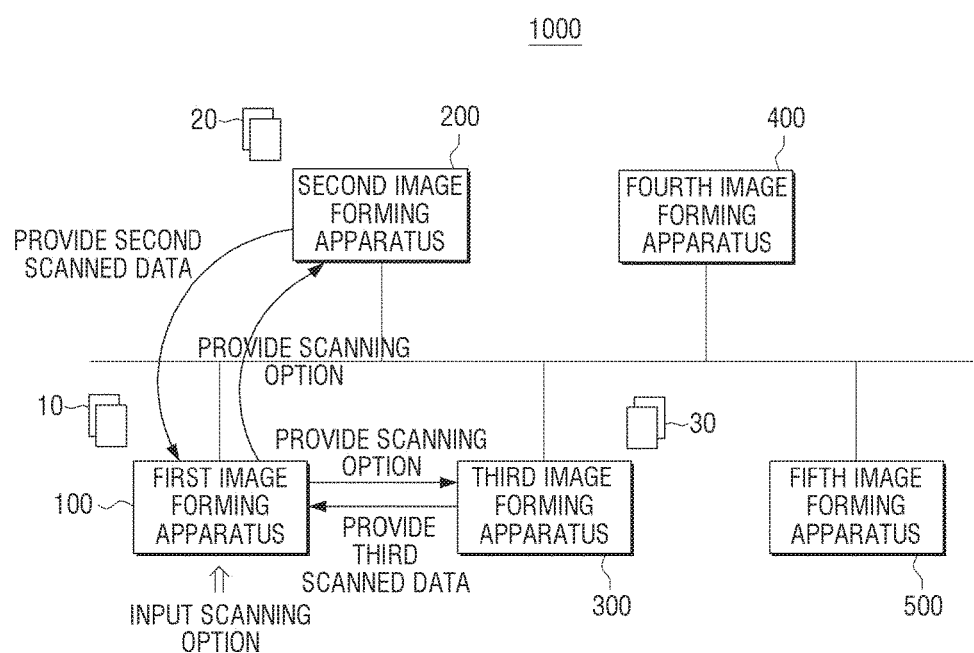
FIG. 2 illustrates a separate scan operation according to an embodiment of the present disclosure.

FIG. 2 is a view provided to explain an embodiment of the present disclosure where a scanning job is separately performed.

Referring to FIG. 2, the image forming system 1000 may include a plurality of image forming apparatuses 100-500, and each of the image forming apparatuses 100-500 may be connected to each other via network, etc. In addition, a user may select at least two devices to perform a separate scanning job from among the plurality of image forming apparatuses 100-500. Hereinafter, the case where a first scanning image forming apparatus 100, a second image forming apparatus 200 and a third image forming apparatus 300 are selected to perform a separate scanning operation will be described as an example.

For example, the user may divide documents to be separately scanned into a first document 10, a second document and a third document 30, and may mount them in a feeder of the first image forming apparatus 100, the second image forming apparatus 200 and the third image forming apparatus 300, respectively.

Hereinafter, the user may input a scanning option to be collectively applied to the first document 10, the second document 20 and the third document 30 in the first image forming apparatus 100. Here, the scanning option is an option which is related to an scanning operation of a scanning unit (not shown), including a both-sides scanning option, a resolution option, an original size option, an original document orientation option, a color mode option, a concentration control option, a background control option, a scanned data file format option, a quality option, etc. Alternatively, the scanning option is an option related to processing of scanned data, including, for example, a scan to server, a scan to e-mail, a scan to PC, an image format conversion (PDF, TIFF, JPEG, BMP, etc.), etc.

The first image forming apparatus 100 may generate first scanned data by scanning the first document 10 according to an input scanning option, and transmit the input scanning option to the second image forming apparatus and the third image forming apparatus 300.

In addition, the second image forming apparatus 200 and the third image forming apparatus 300 may scan the second document 20 and the third document 30 according to the received scanning option to generate second scanned data and third scanned data, respectively. Thereafter, the generated second scanned data and third scanned data may be transmitted to the first image forming apparatus 100, and combined with the first scanned data.

Hereinafter, it is described such that a scanning option input from the first image forming apparatus 200 is applied to other image forming apparatuses; however, any image forming apparatus of the present image forming system 100 may be a subject to receive a scanning option or inversely, may be a subject to generate a scanned data according to the scanning option received from another image forming apparatus.

Hereinafter, for convenience of explanation, various embodiments of the present disclosure will be described, taking examples of a first image forming apparatus 100 which plays a role of providing a scanning option to other image forming apparatuses and a second image forming apparatus 200 which performs a scanning job according to a received scanning option.

Figure 3:
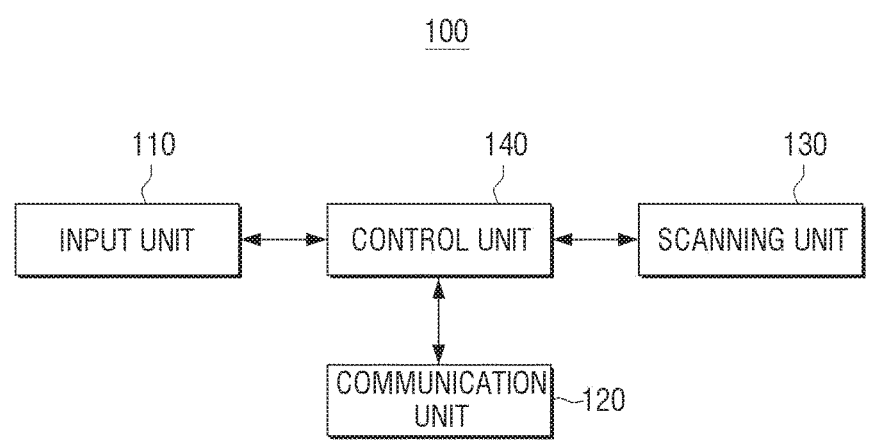
FIG. 3 is a block diagram of an image forming apparatus according to an embodiment of the present disclosure.

FIG. 3 is a block diagram provided to explain a first image forming apparatus 100 according to an embodiment of the present disclosure.

Referring to FIG. 3, the first image forming apparatus 100 includes an input unit 110, a communication unit 120, a scanning unit 130, and a control unit 140.

The input unit 110 may receive a scan command from a user. The input 110 may include a number of function keys where the user may set or select various tasks supported by the first image forming apparatus 100. The input 110 may be realized as an apparatus to realize input and output simultaneously, such as a touch screen, etc., or may be realized as a device through combination of a mouse and a monitor. Further, the input 110 may be realized as various input devices such as a motion sensor which senses a user motion, a voice sensor which senses a user voice, etc.

In particular, the input unit 110 may receive a scanning option to be applied to a scanning job from a user, and may, if the input unit 110 is realized as a touch screen, display a process of processing a scanning option input. For example, a user may, through the input unit 110, input a scanning option to be collectively applied to the first image forming apparatus 100 and other image forming apparatus (not shown), and may individually input a scanning option through a setting UI included in each of the image forming apparatus.

In addition, the input unit 110 may receive a destination of scanned data to be generated from the other image forming apparatus along with input of a scanning option from a user. The destination of scanned data refers to a device to which generated scanned data will be transmitted. For example, if no destination of scanned data is input, scanned data generated from the other image forming apparatus may be automatically transmitted to the first image forming apparatus 100.

Such input of scanning option will be described in greater detail with reference to FIGS. 9 to 12.

The communication unit 120 performs communication with various types of external devices or servers according to various types of communication methods. The communication unit 120 may include various communication chips, such as a Wi-Fi chip, a Bluetooth chip, an NFC chip, a wireless communication chip, etc. Here, the Wi-Fi chip, the Bluetooth chip and the NFC chip perform communication in a Wi-Fi method, a Bluetooth method and an NFC method, respectively. From among them, the NFC chip refers to a chip which operates in an near field communication (NFC) method using 13.56 MHz band from among various RF-ID frequency bands including 135 kHz, 13.56 MHz, 433 MHz, 860-960 MHz, 2.45 GHz, etc. When using various connection information such as an SSID, a session key, etc. may be transceived first, connected using the information, and various information may be transceived. The wireless communication chip refers to a chip which performs communication according to various communication standards such as IEEE, ZigBee, 3rd Generation (3G), 3rd Generation Partnership Project (3GPP) and a Long Term Evolution (LTE).

The communication unit 120 may transmit a scanning option input from the first image forming apparatus 100 to another image forming apparatus. In addition, the communication unit 120 may receive, from the other image forming apparatus, information on whether the transmitted scanning option is applicable. For example, when a scanning option input from the first image forming apparatus 100 includes a PDF file conversion option and the other image forming apparatus which received the scanning option does not have a PDF file conversion function, the other image forming apparatus may transmit a message indicating that a scanning option is not performable, to the first image forming apparatus 100.

When a plurality of scanned data separately processed in each of the image forming apparatuses are combined in the first image forming apparatus 100, the communication unit 120 may receive scanned data generated from the other image forming apparatus. Meanwhile, the separately-processed scanned data may be combined in the other image forming apparatus or in a host device, as well as the first image forming apparatus 100. In this example, the communication unit 120 may transmit scanned data (first scanned data) generated from the first image forming apparatus 100 to the other image forming apparatus or to the host device.

According to an embodiment of the present disclosure, when a new image forming apparatus is added onto the image forming system 1000, the communication unit 120 may receive a device connection request from the new image forming apparatus. The process of transceiving data between such image forming apparatuses will be described in greater detail with reference FIG. 5 as below.

The scanning unit 130 may generate scanned data by scanning a document. For example, the scanning unit 130 may include a scan motor unit (not shown), a scanning unit (not shown) for scanning a document, and an image processing unit (not shown) which processes image data input from the scanning unit.

The scan motor unit may move the scanning unit or the paper, to perform scanning with respect to the entire object. In other words, the scan motor unit moves either the scanning unit or the paper depending on whether the operation method is a sheet-feed method or a flatbed method. For example, if the scan motor unit is operated in a sheet-feed method, the scan motor moves paper. If the scan motor unit is operated in flatbed method, the scan motor unit moves the scanning unit. Such scan motor unit may be realized as a carriage return motor, etc.

The scanning option may include an image reading sensor, a lens, and a light source. The image reading sensor may primarily include a CCD image sensor or a CIS image sensor.

The image processing unit generates scanned data (first scanned data) by performing shading and gamma correction, a dot per inch (DPI) conversion, edge emphasis, error diffusion, scaling, etc., with respect to image data input from the scanning unit. In this case, the image processing unit may generate scanned data in consideration of a scanning option input from the input unit 110. In this example, the scanning option may include a both-sides scanning option, a resolution option, an original size option, an original document orientation option, a color mode option, a concentration control option, a background control option, a scanned data file format option, a quality option, etc. and may, for example, include, as an option related to processing of scanned data, a scan to server, a scan to e-mail, a scan to PC, a format conversion option (PDF, TIFF, JPEG, BMF), etc.

The control unit 140 controls the overall set of the first image forming apparatus 100 according to data and command received from an external device or according to a user command input through the input unit 110. In particular, the control unit 140 may receive scanned data (second scanned data) generated from another image forming apparatus according to a scanning option input from the first image forming apparatus 100 to combine the received scanned data with the first scanned data.

Further, the control unit 140 may, prior to combining scanned data, analyze whether a scanning option is completed with respect to scanned data received from other image forming apparatuses, and with respect to scanned data which has not completed a scanning option, apply the remaining option that are not processed. For example, if scanned data received from another image forming apparatus is data to which a PDF file conversion option is not applied from among the input scanning options, the control unit 140 may convert the received scanned data into a PDF file. According to the present embodiment, even in the case where not all of the input scanning options are performed due to a malfunction of the other image forming apparatus or to insufficient functions included in the other image forming apparatus, all of scanning options input from the first image forming apparatus may be completed.

Further, the control unit 140 may transmit first scanned data to a host device or to another image forming apparatus, In this example, the host device may be realized as various devices such as a cell phone, a Smartphone, a tablet computer, a notebook PC, a terminal for digital broadcasting use, a personal digital assistants (PDA), a portable multimedia player (PMP), a navigation, a digital TV, a desktop PC, and etc.

A host device or another image forming apparatus which received first scanned data generated from the first image forming apparatus 100 and second scanned data generated from the second image forming apparatus 200 may combine the separately-processed first scanned data and second scanned data to generate one data. Combining a plurality of scanned data will be described in greater detail with reference to FIGS. 7 to 8.

The control unit 140 may analyze an input job command, and when the input job command uses a plurality of tasks and some of the plurality of tasks are performed in another image forming apparatus, and the corresponding task would be performed at a much greater speed, recommend another image forming apparatus to perform a separate scanning job. For example, the control unit 140 may determine jobs to be performed in the image forming apparatus 100 and jobs to be performed in the other image forming apparatus, in view of an operation state of the other image forming apparatus within the image forming system 1000 and supportable tasks.

For example, a scanning option input by a user includes a color scanning option and the first image forming apparatus 100 does not include a color image forming unit, another image forming apparatus within a job group where color printing is available may perform color scanning.

In this example, the control unit 140 may determine an apparatus including a color image forming unit within the image forming system 1000 to perform color printing. If the job group includes a plurality of apparatuses that include a color image forming unit, the control unit 140 may determine one other apparatus in view of whether the apparatus is capable of immediately perform printing job (that is, whether error occurs, the number of pending jobs) and in view of a distance from the first image forming apparatus 100 which performs the scanning job. Alternatively, the control unit 140 may determine to perform scanning job by means of all of the plurality of color image forming units.

Further, the control unit 140 may, according to an analysis result of an input job command, compare a job processing speed of a separate scanning method and that of a single scanning job, and may display the comparison result.

In the above-described example, the first image forming apparatus 100 plays a role of receiving a scanning option and transmitting the received scanning option to another image forming apparatus. Hereinafter, a second image forming apparatus 200 which operates by receiving a scanning option input from another image forming apparatus will be described. For convenience of explanation, the first image forming apparatus 100 and the second image forming apparatus 200 are distinguished from each other in terms of role; however, the first image forming apparatus 100 and the second image forming apparatus 200 may physically refer to the same apparatus.

Figure 4:
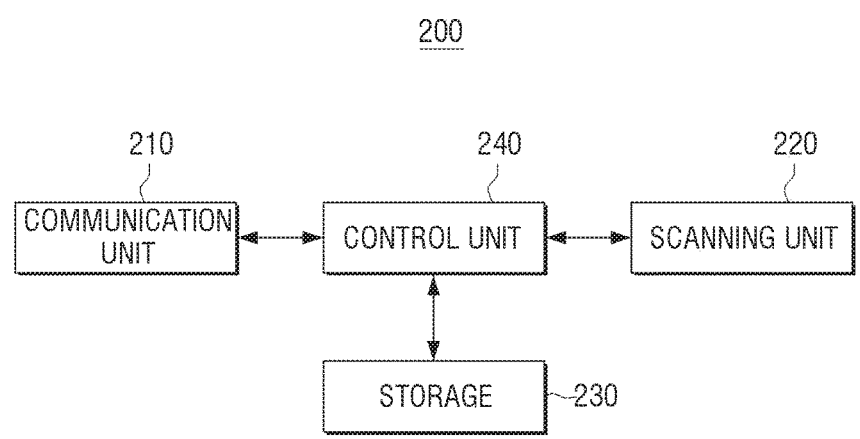
FIG. 4 is a block diagram of an image forming apparatus according to another embodiment of the present disclosure.

FIG. 4 is a block diagram provided to explain a second image forming apparatus according to an embodiment of the present disclosure.

Referring to FIG. 4, a second image forming apparatus 200 includes a communication unit 210, a scanning unit 220, a storage 230, and a control unit 240.

The communication unit 210 may perform communication with various types of external devices or servers according to various types of communication methods. For example, the communication unit 210 may receive a scanning option from the first image forming apparatus 100.

In addition, the communication unit 210 may transmit information on whether the transmitted scanning option is applicable, to the first image forming apparatus 100. For example, the communication unit 210 may, when a scanning option includes a PDF file conversion option and the second image forming apparatus 200 does not have a PDF file conversion function, transmit a message indicating that performing a scanning option is not possible, to the first image forming apparatus 100. Further, according to control of the control unit 240, the communication unit 210 may transmit scanned data to another image forming apparatus having a PDF file conversion function by means of a pre-stored image forming system information.

When it is possible to perform a scanning option, the communication unit 210 may transmit second scanned data generated according to the scanning option to the first image forming apparatus, or to a third image forming apparatus 300 different from the first image forming apparatus 100 and the second image forming apparatus 200, and even to a host device (not shown). The destination to which the second scanned data is to be transmitted may be determined according to a setting input from the first image forming apparatus 100 every time, or may be determined based on a pre-stored setting value.

When scanned data separately processed in each of image forming apparatuses are combined in the second image forming apparatus 200, the communication unit 220 may receive scanned data generated from the other image forming apparatus. In other words, the second image forming apparatus 200 which received a scanning option from the first image forming apparatus 200 may receive the first scanned data generated from the first image forming apparatus 100 to combine the first scanned data with the second scanned data. As such, any one image forming apparatus within the image forming system 1000 may be in charge of combining scanned data, or all of the image forming apparatuses within the image forming system 100 may perform combination of the separately-processed scanned data.

Other functions of the communication unit 210 are identical to those of the communication unit 110 of the first image forming apparatus 100 described with reference to FIG. 3 and thus, the description thereof will be omitted.

The scanning unit 220 may scan a document to generate scanned data. For example, the scanning unit 130 may include a scan motor unit (not shown), a scanning unit (not shown) to scan a document, and an image processing unit (not shown) which processes image data input from the scanning unit.

The scan motor unit moves a scanning unit or a paper to scan the entire object. That is, the scan motor unit moves the scanning unit or the paper depending on whether the operation method of the scanning unit 130 is a sheet-feed method or a flatbed method. For example, the scan motor unit, if the scanning unit is a sheet-feed scanning unit, moves the paper, and if the scanning unit is a flatbed scanning unit, moves the scanning unit. Such scanning motor unit may be realized as a carriage return motor, etc.

The scanning unit may include an image reading sensor, a lens, and a light source, and the image reading sensor may primarily include a CCD image sensor or a CIS image sensor.

Further, the image processing unit generates scanned data (second scanned data) by performing shading and gamma correction, dot per inch (DPI) conversion, edge emphasis, error diffusion, scaling, etc. In this example, the image processing unit may generate scanned data in view of a scanning option input from an input unit (not shown). For example, the scanning option may include a both-sides scanning option, a resolution option, an original size option, an original document orientation option, a color mode option, a concentration control option, a background control option, a scanned data file format option, a quality option, etc., and may, as an option related to processing of scanned data, include, for example, scan to server, scan to e-mail, scan to PC, format conversion (PDF, TIFF, JPEG, BMP, etc.) option, etc.

In particular, the scanning unit 220 may generate scanned data according to a scanning option received from the first image forming apparatus 100. According to another embodiment, the second image forming apparatus 200 may individually receive a scanning option to be applied to the second image forming apparatus 200 only. In this example, a scanning option received from the first image forming apparatus 100 and scanning options input from the second image forming apparatus 200 may be all applied to generate second scanned data. Such individual scanning option may be received from the first image forming apparatus 100 as well.

For example, a user may sort out a document including an image to be color scanned from among a number of documents to be scanned, mount the sorted out document in a scanning unit 220 of the second image forming apparatus 200, and then separately designate a color scanning option in the second image forming apparatus 200 only. Thereby, the other image forming apparatus which performs a separate scanning job may perform a grayscale scanning promptly and a color scanning is performed only in the second image forming apparatus 200, thereby reducing the entire operation time.

For example, the first image forming apparatus 100 may provide a plurality of UI screens for receiving scanning options that are different for each of a plurality of image forming apparatuses within the image forming system 1000.

Such embodiments will be described in greater detail with reference to FIG. 12 as below.

The storage 230 stores various information including a specification of the second image forming apparatus 200, a use condition, print data, scanned data, pre-processed data, print history information, etc., and stores various application programs used in the second image forming apparatus 200 and an operating system (O/S).

In particular, the storage 230 may store a scanning option received from the first image forming apparatus 100. When a scanning job is completed with respect to the corresponding scanning option, the control unit 240 may automatically delete the scanning option to efficiently manage a storage space of the storage 230.

Further, the storage 230 may store a color conversion table. For example, the color conversion table is a look-up table which states conversion values for converting a color in a RGB-colored space into a color in a CMYK-colored space to reproduce a color of a RGB-colored space within print data in an image forming apparatus using a CMYK-colored space. The example of a color conversion table for converting a RGB-colored space into a CMYK-colored space is described in the present embodiment. However, it is also possible to use a color conversion table for converting a space in a color space other than a RGB-colored space into a CMYK-colored space. Such color conversion table may be compensated by a color characteristics compensation command transferred from the first image forming apparatus 100. Thereby, color characteristics of scanned images of the first image forming apparatus 100 and the second image forming apparatus 200 may be unified.

In addition, the storage 230 may store a plurality of color conversion tables. For example, the storage 230 may store a one-dimensional gamma table, a three-dimensional RGB color table for scanning use, a three-dimensional RGB color table for printing use, a panel table, and a screen table.

The storage 230 may store an image corresponding to a color chart. For example, the storage 230 may store an image corresponding to a color chart which includes a plurality of CMYK mixed colors of a sampled RGB color value from among RGB color values of a stored color conversion table. When such color conversion table is converted, an image corresponding to the color chart may be changed as well.

The control unit 240 may control the overall set of the second image forming apparatus 200 according to data and command received from an external device and or according to a user command input from the input unit. For example, the control unit 240 may control the scanning unit 220 to scan a document according to a scanning option received from the first image forming apparatus 100 and generate second scanned data.

The control unit 240 may transmit the generated scanned data to the first image forming apparatus, a host device (not shown) or to the third image forming apparatus 300, etc. according to a destination of scanned data input from the first image forming apparatus 100. In this example, the destination of the scanned data may be arbitrarily set by a user, or may be predetermined for each image forming apparatus.

For example, the destination of the second scanned data may be set to the second image forming apparatus 200, and in this case, the control unit 240 may receive first scanned data generated from the first image forming apparatus 100 and combine it with the second scanned data, without transmitting the second scanned data to another apparatus.

Further, the control unit 240 may analyze whether a scanning option received from the first image forming apparatus 100 is an option which may be carried out in the second image forming apparatus 200. If yes, second scanned data may be generated according to the received scanning option, and if the scanning option includes at least one option that may not be carried out in the second image forming apparatus, control the communication unit 210 to transmit a message indicating that a scanning option may not be carried out, to the first image forming apparatus 100.

According to another embodiment, instead of sending a message indicating that a scanning option cannot be carried out, the control unit 240 may perform an option within the scope that may be carried out by the second image forming apparatus 200 to transmit the second scanned data to the destination. If the destination is the first image forming apparatus 100, the first image forming apparatus 100 may receive the second scanned data to process the remaining scanning options that has not been performed in the second image forming apparatus 200.

For example, when a scanning option includes a background image removal option and the second image forming apparatus 200 does not support a background image removal option function, the control unit 240 may generate the second scanned data without applying a background image removal option, and transmit the second scanned data to the first image forming apparatus 100. In this example, the control unit 140 of the first image forming apparatus 100 may, prior to combining scanned data, analyze whether a scanning option is completed with respect to scanned data received from other image forming apparatuses, and apply the remaining options with respect to scanned data that has not completed a scanning option.

Hereinafter, an interaction between the first image forming apparatus 100 and the second image forming apparatus 200 according to another embodiment will be described with reference to FIG. 5.

Figure 5:
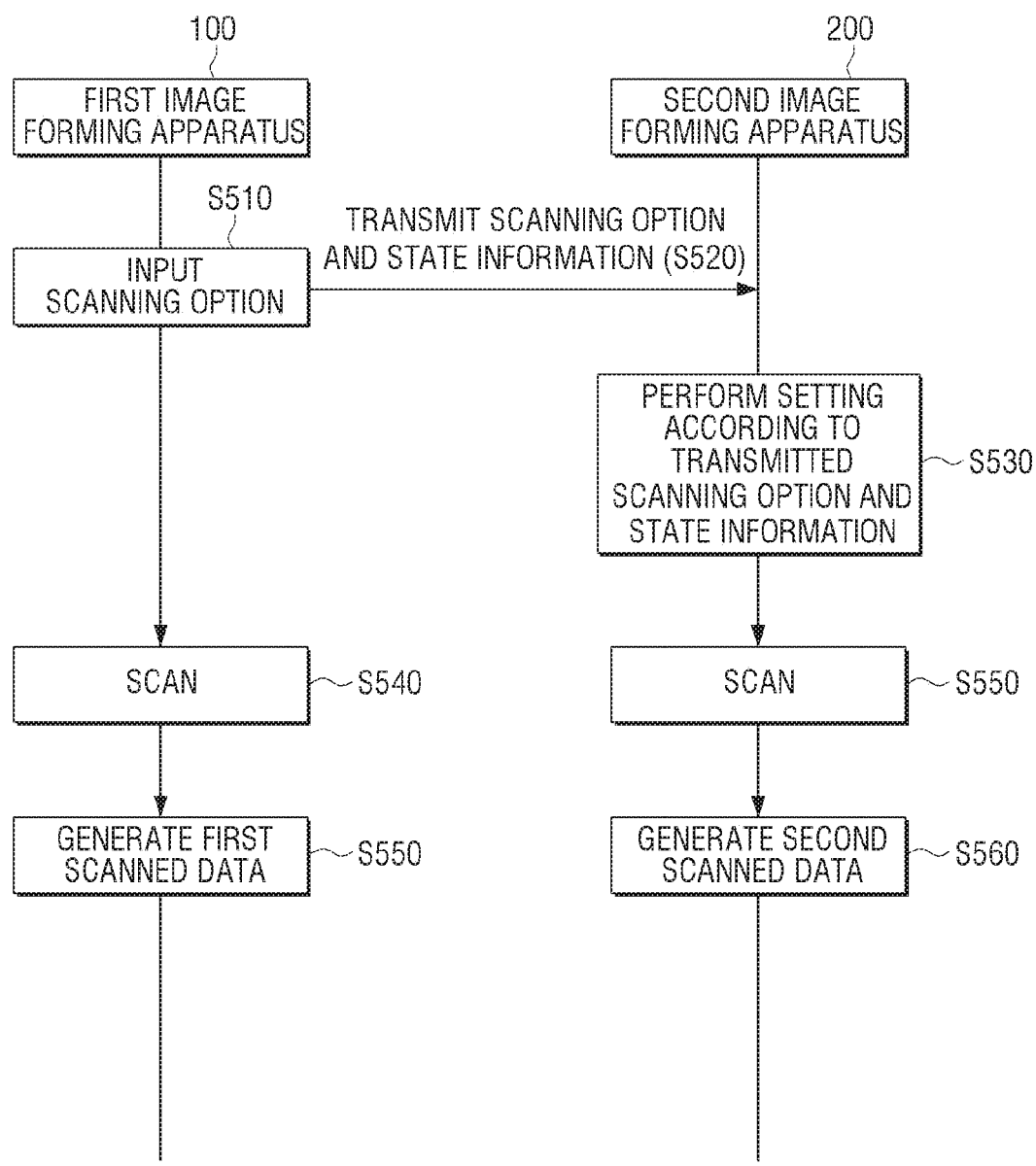
FIG. 5 illustrates interactive operations between a plurality of image forming apparatuses according to an embodiment of the present disclosure.

Referring to FIG. 5, first, the first image forming apparatus 100 receives a scanning option, at step S510. Then, the first image forming apparatus 100 transmits the received scanning option and state information of the first image forming apparatus 100 to the second image forming apparatus, at step S520. Then, the second image forming apparatus 200 is set according to the transmitted scanning option and state information, at step S530.

In this example, the state information may include color temperature information of an image to be scanned in the first image forming apparatus 100 or color characteristic information of an image to be printed in the first image forming apparatus 100. The color temperature represents a color of a light source represented with a number using an absolute temperature. Each image forming apparatus includes a setting of color temperature of its own. For example, the higher the color temperature, the scanned image looks more blue, and the lower the color temperature, the scanned image looks red.

According to an embodiment of the present disclosure, the second image forming apparatus 200 may control its own color temperature setting such that it is identical to color temperature information of the first image forming apparatus 100 included in the state information received from the first image forming apparatus 100. In this manner, the color temperature setting of the first image forming apparatus 100 may be identical to that of the second image forming apparatus 200. Accordingly, the color temperature of each scan image separately processed in the first image forming apparatus 100 and the second image forming apparatus 200 may be controlled the same as if the scan images were generated in one device.

Color characteristic information included in state information may include color characteristic information of an image to be printed in the first image forming apparatus 100. In general, an image forming apparatus has its own color characteristics which are reproduced according to manufacturer or product. It may be characteristics of a toner or ink used by a manufacturer, or may be a color matching-related policy. Since different color characteristics may be generated with respect to the same image per image forming apparatus and thus, when performing a separate print job, a color characteristics matching job is required.

According to an embodiment of the present disclosure, the second image forming apparatus 200 may compensate its own color characteristic information to be identical to the color characteristic information of the first image forming apparatus 100 received from the first image forming apparatus 100. For example, a control unit 140 of the first image forming apparatus 100 may, after printing a test print file, collect color information, analyze the information, profile it, and transmit the profiled information to the second image forming apparatus 200. In addition, the second image forming apparatus 200 may, in the same manner as the first image forming apparatus 100, collect color information, analyze the collected information, profile the analyzed information, and then combine the received color characteristic information of the first image forming apparatus 100 with that of the second image forming apparatus 200. The combined color characteristic information reflects color characteristic information of the first image forming apparatus 100. When the second image forming apparatus 200 uses the color information obtained through combination, it may perform a print job with a color that is almost similar to the color outputted from the first image forming apparatus 100.

According to another embodiment of the present disclosure, for print color matching, the first image forming apparatus 100 may transmit a color characteristic information compensation command to the second image forming apparatus 200, and the second image forming apparatus 200 may compensate its own color characteristic information according to the received compensation command.

For example, the control unit 140 of the first image forming apparatus may print a CMYK pattern in an internal drum, measure each pattern with a sensor to calculate a measurement value, and transmit a command such that the second image forming apparatus 200 performs the same measurement. Further, the first image forming apparatus 100 may receive the measurement value from the second image forming apparatus, calculate a difference from the measurement value of the second image forming apparatus 200 on the basis of the measurement value of the first image forming apparatus 100 to determine the calculated value as a compensation value, and transmit the determined value to the second image forming apparatus 200. The second image forming apparatus 200 may change its own CMYK drum and the numerical value of a developing unit according to the transmitted compensation value.

For example, when a CMYK pattern value of the first image forming apparatus 100 is (10, 9, 7, 5) and that of the second image forming apparatus 200 is (5, 4, 7, 5), the first image forming apparatus 100 determines (+5, +5, 0, 0) as a compensation value. Also, the second image forming apparatus 200 which received a compensation command including a compensation value from the first image forming apparatus 100 may compensate its own color characteristic information based on the compensation value.

The process as described above may be repeatedly to increase the accuracy of matching of print color. That is, the second image forming apparatus 200 may, after a compensation value has been applied, measure a CMYK value again and transmit the re-measured CMYK value to the first image forming apparatus 100. The first image forming apparatus 100 may, based on the received re-measurement value, determine whether compensation as to color characteristic information has been properly performed as mentioned above. If the compensation has not been performed properly, the aforementioned compensation process may be repeated. Such repeated unification of color characteristic information may require additional time and thus, the apparatus may be turned on and off according to a user selection.

By the unification of color characteristic information as shown above, a unification of a scan image between outputs output from each of the image forming apparatus or unification of a print color may be carried out.

After the unification of color characteristic information, the first image forming apparatus 100 scans a document according to a scanning option, at step S540. Then, the second image forming apparatus 200 scans a document according to a scanning option, at step S550. Thereafter, the first image forming apparatus 100 generates first scanned data to which the scanning option is applied, at step S550, and the second image forming apparatus 200 may generate second scanned data to which the same scanning option as the first scanned data is applied, at step S560.

The first scanned data and the second scanned data generated in each of the apparatuses may be generated as one scan image file in the first image forming apparatus 100 or in the second image forming apparatus 200, or may be output as a bundle of print-outs. Further, the data may be combined in a separate image forming apparatus, or may be combined in a host device. An embodiment where a separate task is combined in a separate image forming apparatus or in a host device will be described in greater detail with reference FIG. 6 as below.

Figure 6:
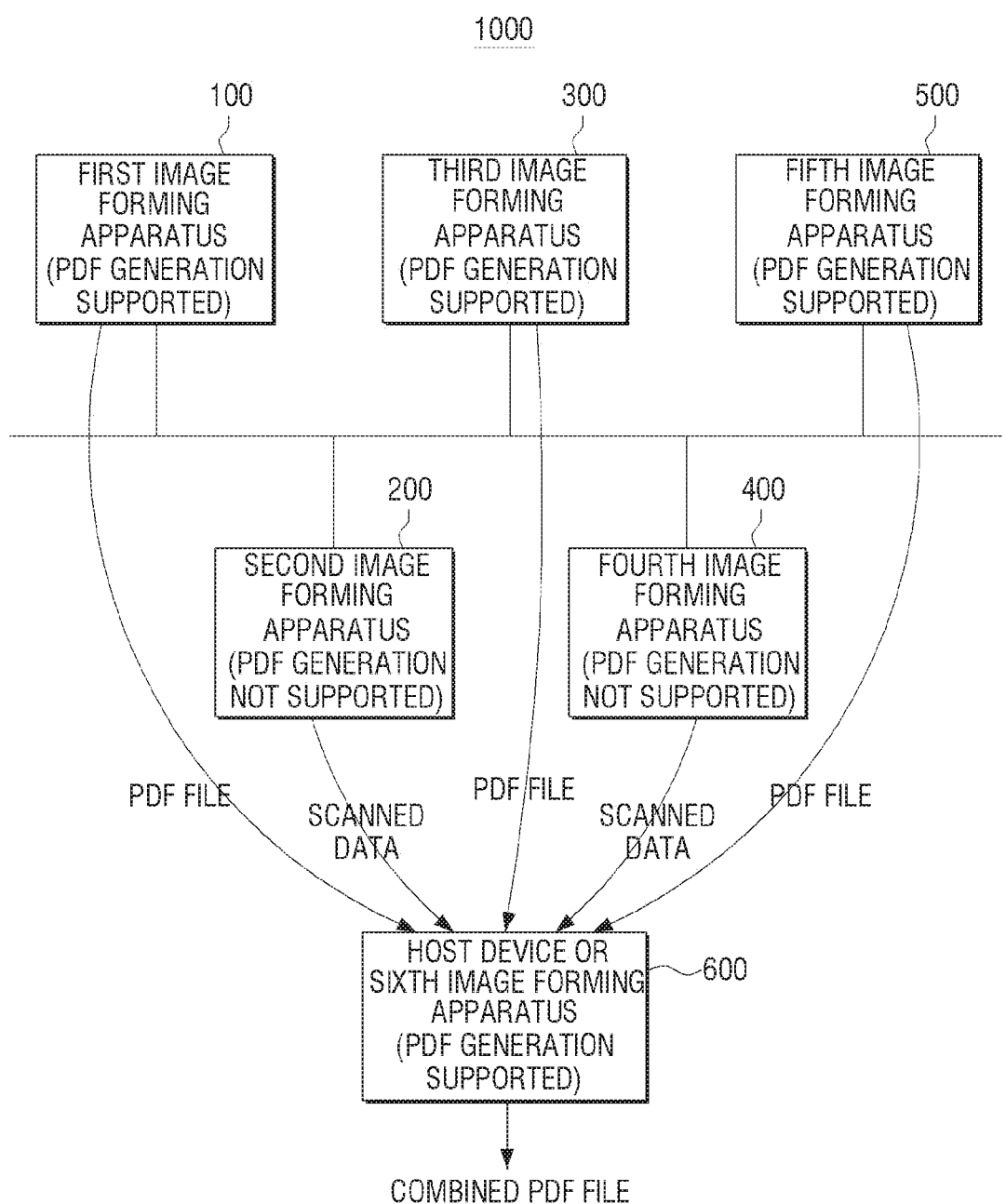
FIG. 6 illustrates a method for combining operations that have been processed separately, according to an embodiment of the present disclosure.

FIG. 6 is a view provided to explain a method for combining separate tasks, according to an embodiment of the present disclosure.

Referring to FIG. 6, a plurality of image forming apparatuses 100-500 may individually perform a separate task, and may transmit an output to one device. For example, in the first image forming apparatus 100, if it is determined that a destination of a plurality of scanned data to be generated in each of a plurality of image forming apparatuses 100-500 is a sixth image forming apparatus or a host device 600, scanned data generated in the respective plurality of image forming apparatuses 100-500 may be transmitted to the sixth image forming apparatus or to the host device 600, and may be combined. The combined scanned data may be converted into a scan image, or may be sequentially output on a paper.

The functions of a plurality of image forming apparatuses included in the image forming system may differ. For example, if a user wants to generate a combined PDF file, the user may perform a separating task by selecting only the first image forming apparatus 100, a third image forming apparatus 300 and a fifth image forming apparatus 500 which support a PDF file generating function. According to an embodiment of the present disclosure, the second image forming system 200 and a fourth image forming apparatus 400 which do not support a PDF file generating function may be used as well, to thereby reduce working time.

For example, a host device or the sixth image forming apparatus 600 may, when a PDF file generating function is supported, convert scanned data received from the second image forming apparatus 200 and the fourth image forming apparatus 400 into a PDF file, and may combine the converted scanned data with a PDF file received from the first image forming apparatus 100, the second image forming apparatus 200 and the third image forming apparatus 300.

The present embodiment is described as relating to a PDF file generating function; however, the present embodiment is, without limitation, applicable to a scan-to-e-mail, a scan-to-PC functions, etc. For example, as for an image forming apparatus which supports a scan-to-e-mail, it may be set such that after generating scanned data, e-mail is sent. As for an image forming apparatus which does not support a scan-to-e-mail function, a destination of scanned data may be set to transmit the scanned data to another image forming apparatus or host device which support the corresponding function.

Hereinafter, various embodiments for aligning scanned data separately processed in each of image forming apparatuses will be described.

Figure 7:
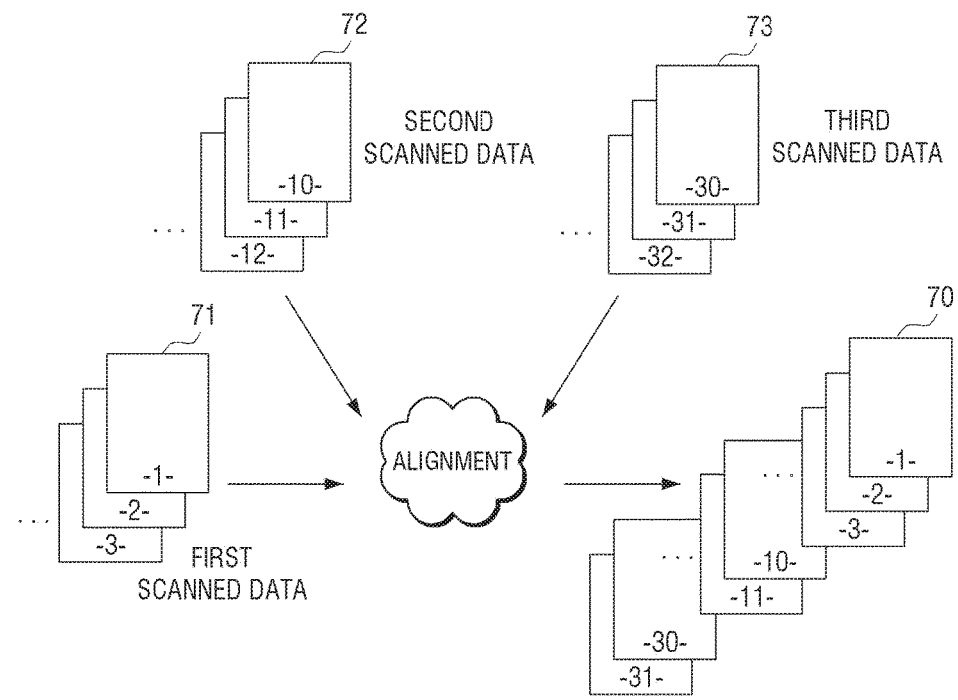
FIGS. 7 to 8 illustrate a method for arranging scan documents, according to various embodiments of the present disclosure.

FIG. 7 is a view provided to explain a method for aligning scanned data according to an embodiment of the present disclosure.

Referring to FIG. 7, first scanned data 71 which is generated in the first image forming apparatus 100, second scanned data 72 which is generated in the second image forming apparatus 200 and third scanned data 73 which is formed in the third image forming apparatus 300 may have a predetermined priority. The priority refers to an order of combination of scanned data designated by a user. For example, such priority may, when a scanning option with respect to the first image forming apparatus 100, the second image forming apparatus 200 and the third image forming apparatus 300 is input, be set along with the scanning option.

Thereafter, when a plurality of scanned data is transmitted to the first image forming apparatus 100, according to the set priority, the control unit 140 may sequentially collect a scan image corresponding to the first scanned data 71, a scan image corresponding to the second scanned data 72 and a scan image corresponding to the third scan image to generate one combined scan image file 70.

Hereinabove, an embodiment where scanned data are combined by a priority set by scanned data is described. Hereinafter, through FIG. 8, another embodiment of the present disclosure where scanned data are combined per page of a document will be described.

Figure 8:
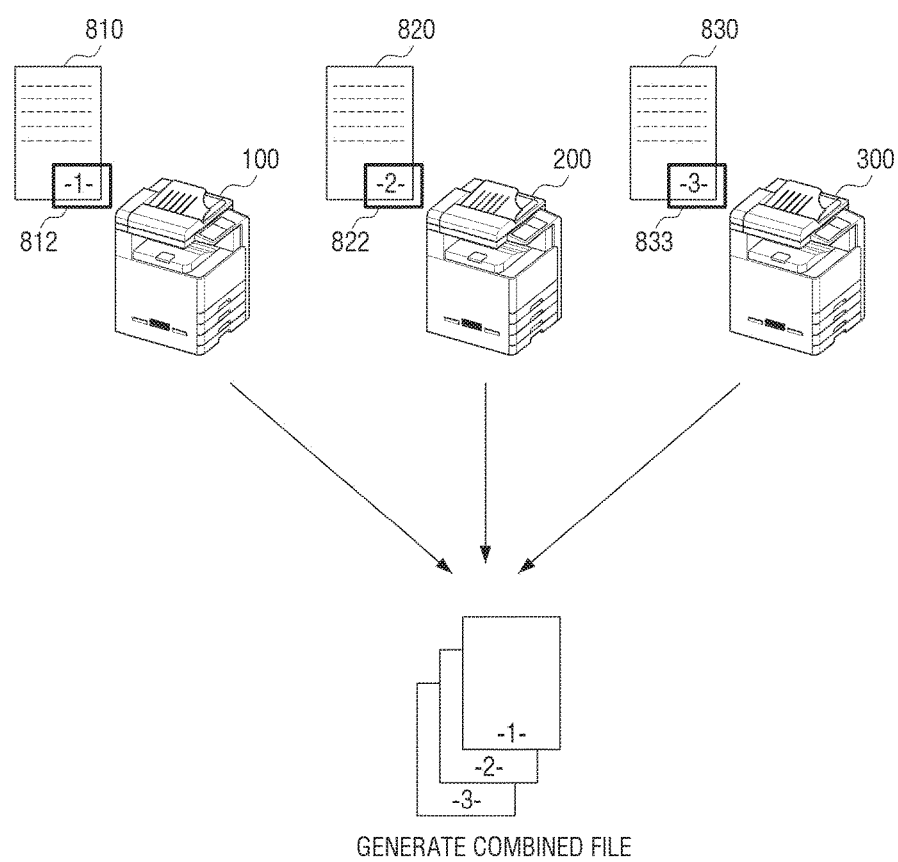

FIG. 8 is a view provided to explain a method of aligning scanned data according to another embodiment of the present disclosure.

Referring to FIG. 8, a first document 810, a second document 820 and a third document 830 may be scanned in the first image forming apparatus 100, the second image forming apparatus 200 and the third image forming apparatus 300, respectively, according to a scanning option input from the first image forming apparatus 100. Each of the documents may include an area 812, 822, 833 which states a page number, and then, scanned data may be combined based on an order of the page numbers.

Scanned data generated in the respective image forming apparatuses 100-300 may, for example, be transmitted to the destination, that is, the first image forming apparatus 100, and the control unit 140 of the first image forming apparatus 100 may convert each of the transmitted scanned data into a scan image. In addition, the control unit 140 may detect a page number indicated in each of the scan images to align and combine each of the scanned data according to an order of the page numbers. According to an embodiment of the present disclosure, the control unit 140 may recognize a particular area with an optical character recognition (OCR), and may align scanned data in n order of detection by recognition to generate a combined file.

A user may directly designate an area of a scan image to which OCR recognition is to be performed. For this purpose, an input unit 110 of the first image forming apparatus 100 may display a UI for designating a page number area. For example, the UI for designating a page number area may include a scan image preview screen with respect to representative first document 810 from among scanned documents, and the user may designate an area 812 which displays the page number in the preview screen. The control unit 140 may apply an area designated in the preview screen of the first document 810 to scan images of the second document 820 and the third document 830 to recognize page numbers of all scan images. Thereafter, the control unit 140 may align scanned data in an order of recognized numbers to generate a combined file.

When a user mounts a document in a scanning unit of each image forming apparatus, one or more areas to recognize a page number may be designated in case where an aligning orientation of a document is not unified. For example, a UI for designating a page number area may receive designation of at least one page number. In this case, for example, a user may designate a lower end or upper end of the scan image preview screen as an area for recognizing a page number. The control unit 140 may perform OCR recognition with respect to the lower and upper ends with respect to scan images of all documents. In this example, the control unit 140 may recognize an orientation of recognized page numbers to unify orientations of images between each document. With respect to a document including a page number placed on the other side, the control unit 140 may realign an orientation of a scan image to generate a combined file. In this case, a standard as to a correct page number orientation may be a page number orientation that was initially recognized.

Also, the combined file generated in the process as shown above may be sequentially output on a paper by the first image forming apparatus 100.

According to the above-described embodiment, scan images generated in different image forming apparatuses may be automatically aligned per page unit. Further, a user may sort out a document including an image, from among documents to be scanned, to mount the sorted out document in an image forming apparatus in charge of a color scanning option, mount documents including the remaining document in an image forming apparatus in charge of a grayscale scanning option, and control a scan job to be performed according to each scanning option, to thereby ultimately obtain a combined file which is aligned in an order of page numbers.

According to the various embodiments of the present disclosure, each image forming apparatus within the image forming system 1000 may perform different jobs. Hereinafter, a scanning option input UI provided by an image forming apparatus according to various embodiments of the present disclosure will be described with reference to FIGS. 9 to 10.

Figure 9:
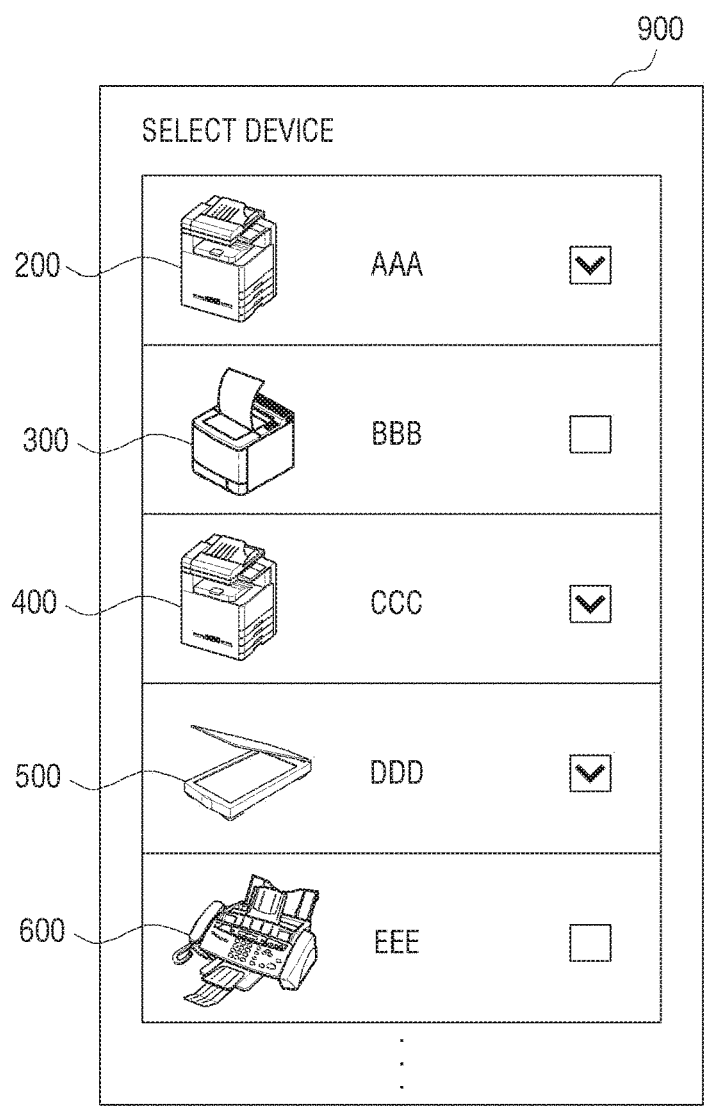
FIGS. 9 to 10 illustrate a method for selecting an object to be separated, according to various embodiments of the present disclosure.

FIG. 9 is a view provided to explain a scanning option input UI provided by the first image forming apparatus 100 according to an embodiment of the present disclosure.

Referring to FIG. 9, an input unit 110 or a display (not shown) of the first display apparatus 100 may display a list 900 of a plurality of image forming apparatuses connected to the first image forming apparatus 100 via network, etc.

Using the list 900, the user may select an image forming apparatus to perform a separate scan task from among the second to sixth image forming apparatuses 200-600 connected to the first image forming apparatus 100.

In FIG. 9, it is described that the list 900 is displayed and then, an apparatus to perform a separate scan task is selected; however, the user may retrieve an image forming apparatus to perform a separate scan task, and select an apparatus from the retrieval result. For example, when image forming apparatuses within the image forming system 1000 are located in each floor within a building, the user may designate a particular floor as a search field. The control unit 140 may perform filtering according to pre-stored position information of other image forming apparatuses to display a list that includes image forming apparatuses disposed in the particular floor.

Further, the control unit 140 may display a list of image forming apparatuses to perform a separate scan task based on a position of a user. For example, the control unit 140 may display a list of image forming apparatuses that are close to the first image forming apparatus 100.

As described above, when selection of an image forming apparatus to perform a separate scan task is completed, the user may input a scanning option to be collectively applied to the selected apparatuses. The input of scanning option may be performed prior to the selecting of apparatus.

When a scanning option is input before selecting of an apparatus, the control unit 140 may display only an apparatus to which the input scanning option may be applied, from among the second to sixth image forming apparatuses 200-600 connected to the first image forming apparatus 100. For example, if the input scanning option includes an option to convert scanned data to a PDF file, only an apparatus which supports a PDF file conversion function is displayed, or an apparatus which does not support a PDF file conversion function may be displayed as inactivated.

Figure 10:
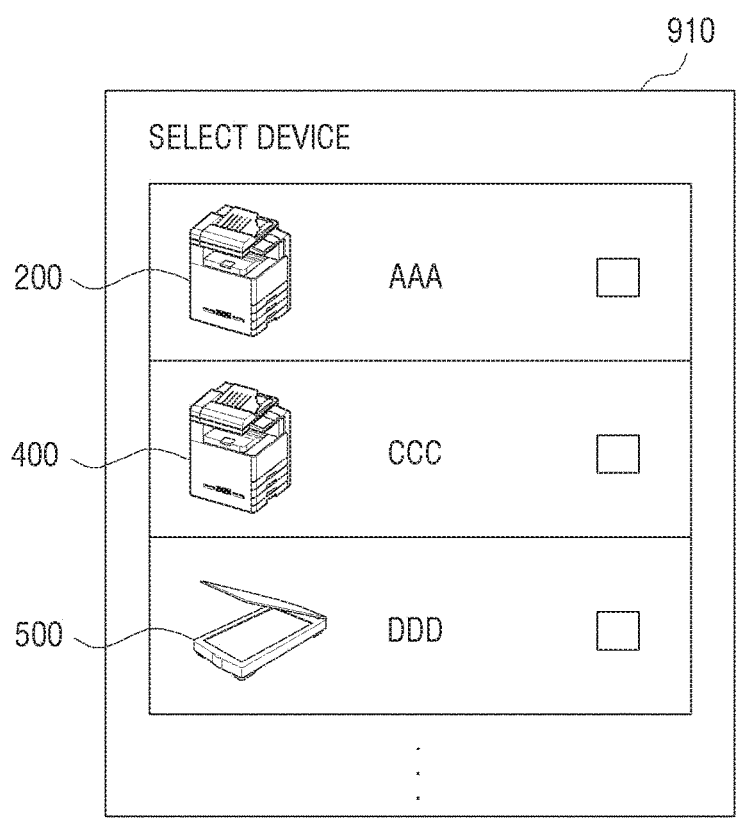

For example, a storage (not shown) of the first image forming apparatus 100 may store information on functions that may be carried out by devices connected to the first image forming apparatus 100. Based on the stored information, the control unit 140 may, after analyzing the input scanning option, control the input unit 110 to display only a device to which the scanning option may be applied. Referring to FIG. 10, only the second image forming apparatus 200, the fourth image forming apparatus 400 and the fifth image forming apparatus 500 which may support a PDF file conversion function may be displayed in a UI 910 for selecting an apparatus. The user may select an apparatus to perform a separating job from among the apparatuses displayed in the UI 910 for selecting an apparatus.

The input unit 110 may, when an error occurs in another image forming apparatus that carries out a separating job, displays that an error has occurred, and display a list of other image forming apparatuses that may be of a substitute to perform a job performed in the image forming apparatus where the error has occurred. Accordingly, the user may resume the job by selecting another image forming apparatus on the list. Further, when the image forming apparatus selected to perform a separating job is currently being used by another user, the input unit 110 may display an end time of that image forming apparatus. The user may efficiently select an image forming apparatus based on the provided information.

In the case of a company or public offices, when there are a large number of image forming apparatuses included in the image forming system 1000, it may be difficult to determine a state of a plurality of image forming apparatuses. Thus, it is desirable that an image forming system includes less than ten units of image forming apparatuses to perform a separating job.

Hereinafter, a method for generating a task group having an appropriate number of apparatuses will be described.

First, the control unit 140 of the first image forming apparatus 100 may control a display to display a list of a plurality of other connectable image forming apparatuses, and generate an image forming apparatus selected from the displayed list as a task group. Although it is described in the above example that a user selects an image forming apparatus to be included in a task group after displaying a list of connectible image forming apparatuses, information on another image forming apparatus to be included in a task group may be directly input. For example, when receiving information which may specify an image forming apparatus, such as IP address, device name, any phone number (phone number assigned to the corresponding device to perform cloud printing) of the other image forming apparatus, the input apparatus may be added to a task group including a current image forming apparatus.

Although it is described in the above example that all of the retrieved image forming apparatuses are displayed, any one of the below methods may be applied to display only a list of image forming apparatuses that satisfy a predetermined condition. For example, only a list of other image forming apparatuses having the same subnet address as the first image forming apparatus 100 may be displayed.

Further, the control unit 140 may search for connectible image forming apparatus via a nearfield network, and generate the retrieved image forming apparatus as a task group. Herein, the nearfield network may be Bluetooth. Although only a Bluetooth is used in the above example, other wireless network methods that does not have a wide communication distance may be used as well.

Further, the control unit 140 may acquire a device name of other connectible image forming apparatus, and generate a task group including another image forming apparatus having an identifier that is identical to a device name of the image forming apparatus 100.

Further, the control unit 140 may acquire address information including IP address of another connectible image forming apparatus, and compare the acquired address information with address information of the image forming apparatus 100 to generate a task group. Herein, the control unit 140 may generate a task group by excluding another image forming apparatus having a hop count having a predetermined value and another image forming apparatus having different SSID information from the image forming apparatus 100 from the task group.

The task group generation method as described above may be combined in series and/or in parallel. For example, in series, two embodiments which use a method of using IP information and nearfield network may be combined with each other, to thereby generate a task group with only an apparatus which may perform interactive nearfield network communication from among image forming apparatuses within the same subnet.

It is described in the example that the image forming apparatus generates a task group. In this case, every image forming apparatus within the system may individually generate a task group. Alternatively, only a particular image forming apparatus within the system may generate the aforementioned task group. In this case, the particular image forming apparatus may be an apparatus which may perform various functions compared with the other apparatuses or may be a state-of-the-art apparatus.

Hereinafter, a method for collectively applying a scanning option to apparatuses selected to perform a separate scan task will be described with reference to FIG. 11.

Figure 11:
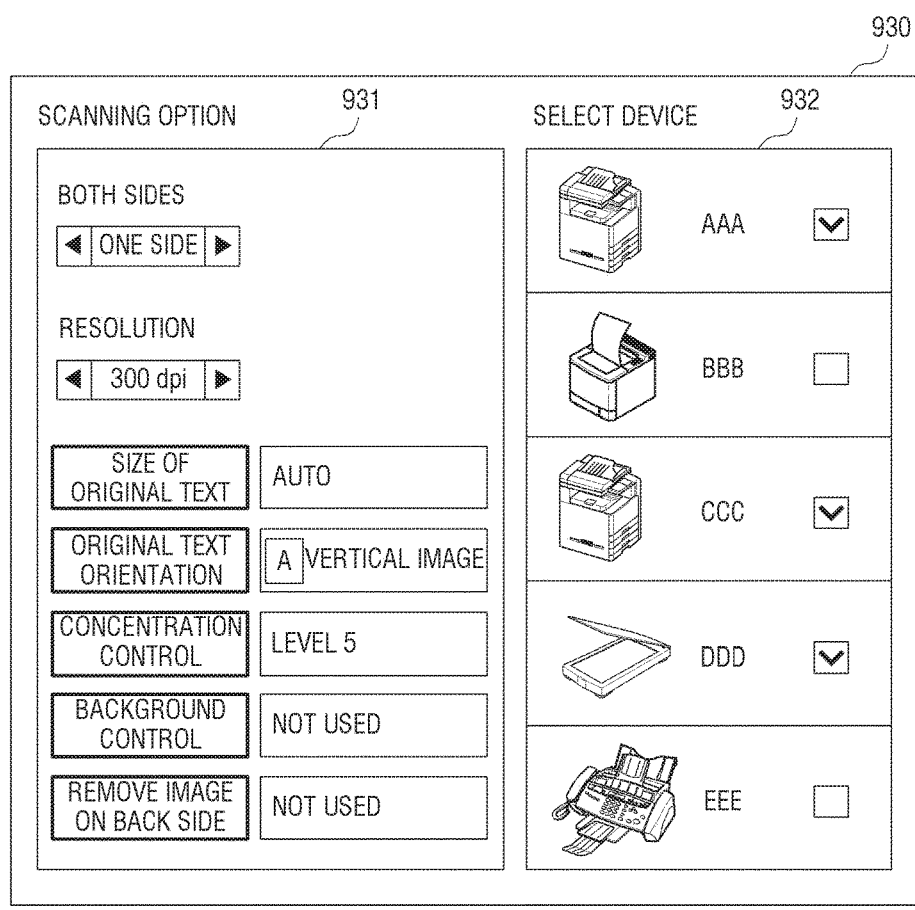
FIGS. 11 to 12 illustrate a method for inputting a scanning option, according to various embodiments of the present disclosure.

FIG. 11 is a view provided to explain a UI for receiving a scanning option provided by the first image forming apparatus 100 according to an embodiment. As shown in FIG. 11, the input unit 110 of the first image forming apparatus 100 may display a UI 930 to receive a scanning option to be collectively applied to the first image forming apparatus 100 and the other image forming apparatus.

In this example, according to various embodiments of the present disclosure, as described with reference FIG. 9, a scanning option may be input through an additional UI after an apparatus is selected. Further, as illustrated in FIG. 11, the input unit 110 may display a UI 930 including an apparatus selection UI 932 and a scanning option UI 931. The user may, through the scanning option UI 931, input a scanning option to be collectively applied to the first image forming apparatus 100 and the other image forming apparatus, and may select an apparatus to perform a separate task through the apparatus selection UI 932.

In this example, when a scanning option is input through the scanning option UI 930, the apparatus selection UI 932 may display only an apparatus to which the input scanning option may be applied, as inputtable state. For example, as for an apparatus to which the input scanning option cannot be applied, the apparatus selection UI 932 may dimly display the apparatus on a UI screen or may display as inactivated.

According to another embodiment of the present disclosure, a scanning option may not be collectively applied to a plurality of image forming apparatuses, but may be individually applied to each and every image forming apparatus. Hereinafter, it will be described in greater detail with reference to FIG. 12.

Figure 12:
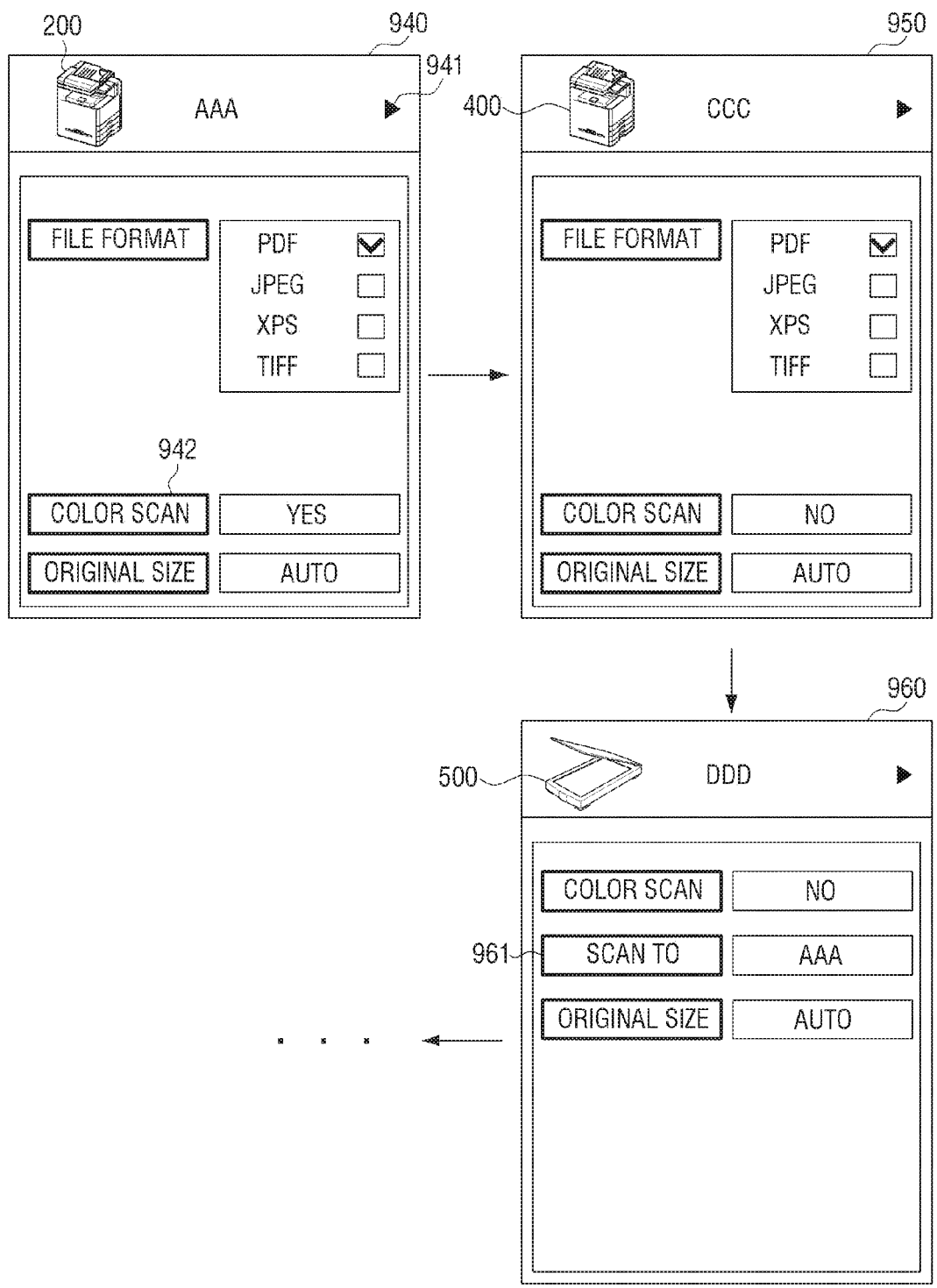

FIG. 12 is a view provided to explain a UI to receive a scanning option provided by the first image forming apparatus 100 according to another embodiment of the present disclosure. As shown in FIG. 12, the input unit 110 of the first image forming apparatus 100 may sequentially display a UI to input a scanning option to each image forming apparatus according to a user manipulation.

For example, first, a UI 940 to receive a scanning option for the second image forming apparatus 200 is displayed. The user may, in the UI 940, set a file format of scanned data to be generated in the second image forming apparatus 200, a color scanning option 940, etc. Further, when a next button 941 is depressed again, a UI (not shown) to receive a scanning option the third image forming apparatus 300 may be displayed subsequently, and when the next button 941 is depressed again, a UI 950 to receive a scanning option for the fourth image forming apparatus 400 may be displayed.

For example, when the user desires to perform a color scan with respect to the second image forming apparatus 200 only, the user may set Yes for the color scanning option 942, and through the UI 950 to receive a scanning option for the fourth image forming apparatus 400, set such that a color scan is not performed with respect to the fourth image forming apparatus 400. Further, it may be set such that in a UI 960 to receive a scanning option for the fifth image forming apparatus 500 as well, a color scan is not performed with respect to the fifth image forming apparatus 500.

As such, the user may set such that a color scan task which takes a relatively long time to perform a job is performed all in one device, thereby reducing the total work time.

If the fifth image forming apparatus 500 does not support a PDF file generation function unlike the second image forming apparatus 200 and the fourth image forming apparatus 400, the user may set such that scanned data generated in the fifth image forming apparatus 500 is transmitted to an apparatus which supports a PDF file generation function. For example, when a scan to option 961 is set for AAA device, scanned data generated in the fifth image forming apparatus 500 may be transmitted to the AAA device, that is, the second image forming apparatus 200, and may be converted into a PDF file in the second image forming apparatus 200.

As such, according to the present embodiment, a scanning option with respect to each image forming apparatus may be collectively set in a particular image forming apparatus, or may be set individually. Further, another image forming apparatus may be used in case of a function that may not be performed by a particular image forming apparatus, to thereby compensate each other.

According to the image forming apparatus according to the various embodiments of the present disclosure, a large amount of documents may be divided and scanned in a plurality of image forming apparatuses, thereby reducing work time compared with a conventional method. Further, the user may control a scan task of another image forming apparatus through one image forming apparatus, so that the user does not have to input a scanning option to a plurality of image forming apparatuses individually. Hereinafter, a flowchart of an operation of an image forming apparatus according to the various embodiments will be described.

Figure 13:
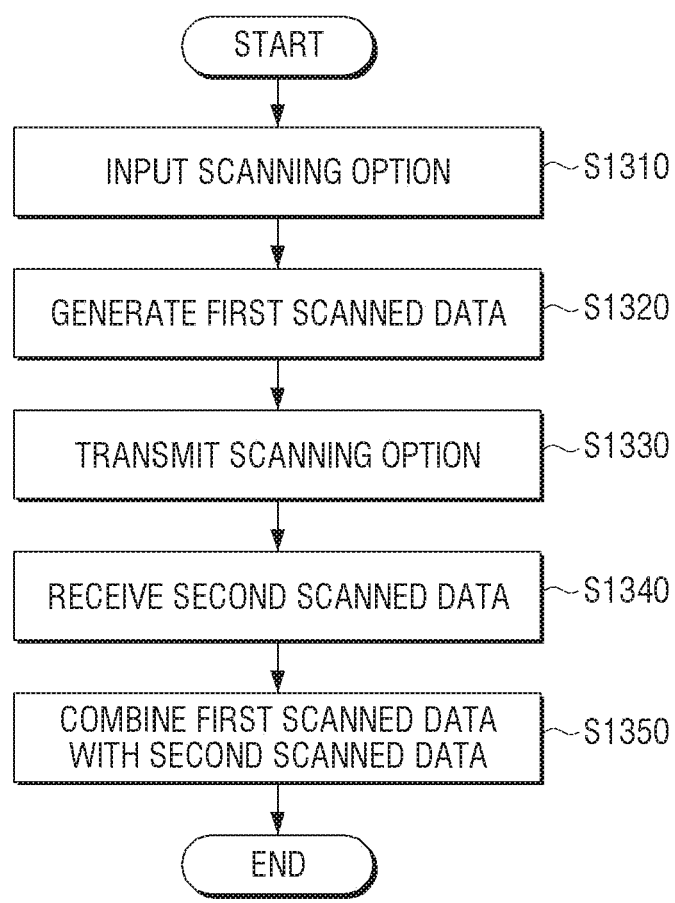
FIG. 13 illustrates a scanning method of an image forming apparatus, according to an embodiment of the present disclosure.

FIG. 13 is a flowchart provided to explain a scanning method of an image forming apparatus according to an embodiment of the present disclosure, that is, a scanning method of a first image forming apparatus 100 which receives a scanning option to be collectively applied to other image forming apparatuses.

Referring to FIG. 13, first, an input unit 110 of the first image forming apparatus 100 receives a scanning option, at step S1310. In this example, the scanning option may be a scanning option to be collectively applied to other image forming apparatuses, or may be a plurality of different scanning options to be applied to each of the image forming apparatuses individually.

For example, the scanning option may be a both-sides scanning option, a resolution option, an original size option, an original document orientation option, a color mode option, a concentration control option, a background control option, a scanned data file format option, a quality option. Further, as an option related to processing scanned data, the scanning option may, for example, include a scan to server, scan to e-mail, scan to PC, format conversion (PDF, TIFF, JPEG, BMP, etc.) option. Such scanning option may be input by a button physically included in the first image forming apparatus 100, or may be input through a touch panel.

Thereafter, the first image forming apparatus 100 may generate first scanned data by scanning a first document mounted in the scanning unit 130 according to the input scanning option. Then, the first image forming apparatus 100 transmits the input scanning option to another image forming apparatus, at step @1330. Although it is described with reference to FIG. 13 that a scanning option is transmitted to another image forming apparatus after generating first scanned data, the first scanned data may also be generated after the scanning option is transmitted to the other image forming apparatus.

After transmitting a scanning option, the first image forming apparatus 100 may receive second scanned data generated by scanning a second document according to a scanning option in the other image forming apparatus, at step S1340. In this example, the second scanned data may be data to which all of the input scanning option is applied, or may be data to which only some of the input scanning option is applied. The control unit 140 of the first image forming apparatus 100 may determine whether the received scanned data reflects all of the scanning option, and generate an ultimate second scanned data by applying the remaining option that had not been applied.

Then, the first image forming apparatus 100 combines the first scanned data with the received second scanned data, at step S1350. In this case, according to a priority set for the first scanned data and the second scanned data, the first scanned data and the second data may be sequentially aligned and combined. For example, if pages 1 to 10 of the document are mounted in the first image forming apparatus 100, and pages 11 to 20 are mounted in the second image forming apparatus 200, and pages 21 to 30 are mounted in the third image forming apparatus 300, the user may, through the input unit 110, set a highest priority to the first scanned data to be generated in the first image forming apparatus, and may set a sequential priorities with respect to the second scanned data to be generated in the second image forming apparatus 200 and the third scanned data to be generated in the third image forming apparatus 300.

Further, the control unit 140 may convert each scanned data into image data, and after detecting a page number from the converted image, align each scanned data in an order of page numbers and combine them. In this example, the user may, through the input unit 110, designate an area from which a page number is to be detected, through a preview screen of the converted image. Alternatively, in view of the fact that a page number is normally placed at a lower end or upper end of the document, page detection may be performed according to a predetermined page detection area.

Thereafter, the combined scanned data may be converted into an image file, and transmitted to the host device or to an e-mail. Further, according to a copy command of a user, the combined scanned data may be output in a paper in the first image forming apparatus.

Figure 14:
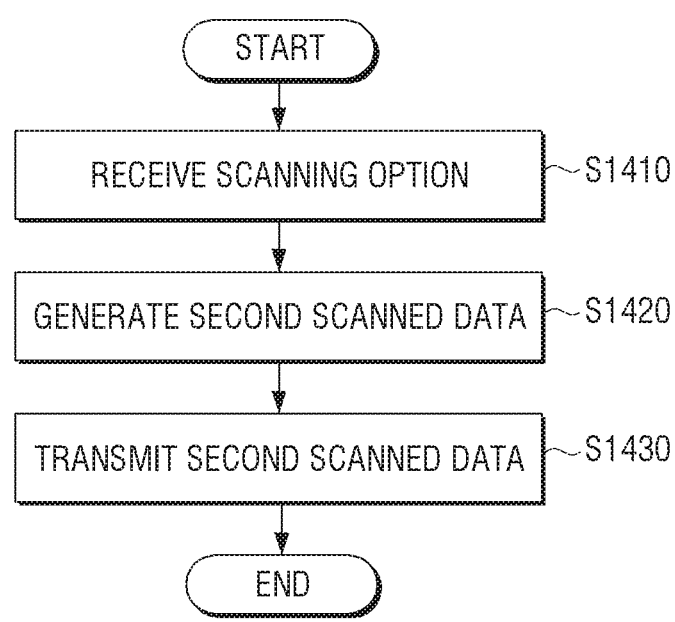
FIG. 14 illustrates a scanning method of an image forming apparatus, according to another embodiment of the present disclosure.

FIG. 14 is a flowchart provided to explain a scanning method of an image forming apparatus according to an embodiment of the present disclosure, that is, a scanning method of the second image forming apparatus 200 which performs a scan job by receiving a scanning option from another image forming apparatus.

First, the second image forming apparatus 200 receives a scanning option which is input from the first image forming apparatus 100, at step S1410.

Further, according to the received scanning option, the second image forming apparatus 200 generates second scanned data by scanning a second document mounted in the scanning unit 220, at step S1420. Meanwhile, when the received scanning option includes a scanning option which is not supported by the second image forming apparatus 200, the second image forming apparatus 200 may generate second scanned data by applying only supportable options. Alternatively, the second image forming apparatus 200 may transmit a message indicating that a scan job is not available, to the first image forming apparatus 100.

When the second scanned data is generated, the second image forming apparatus 200 transmits the second scanned data to the first image forming apparatus 100, at step S1430. According to another embodiment, the second image forming apparatus 200 may, instead of transmitting the second scanned data to the first image forming apparatus 100, receive first scanned data from the first image forming apparatus 100 to combine the first scanned data with the second scanned data.

The various operations of the present image forming apparatus described with reference to FIGS. 1 to 12 may be added to the scanning method of the image forming apparatus described with reference to FIGS. 13 and 14, thereby deriving a scanning method of various image forming apparatus according to the present invention. Such various examples may be explained by the aforementioned methods, or may be supplemented.

The aforementioned various embodiments may be applied to a fax operation, etc. as well as scanning and copying operations. For example, fax sending is, in general, an operation that takes a long time. According to another embodiment of the present disclosure, one device generates a plurality of scan images to perform a fax sending operation with respect to some of the scan images, and another device may transmit the other scan images to perform a fax sending operation with respect to the remaining scan images.

Hereinafter, a fax sending and receiving job performed by the present image forming apparatus will be described.

Figure 15:
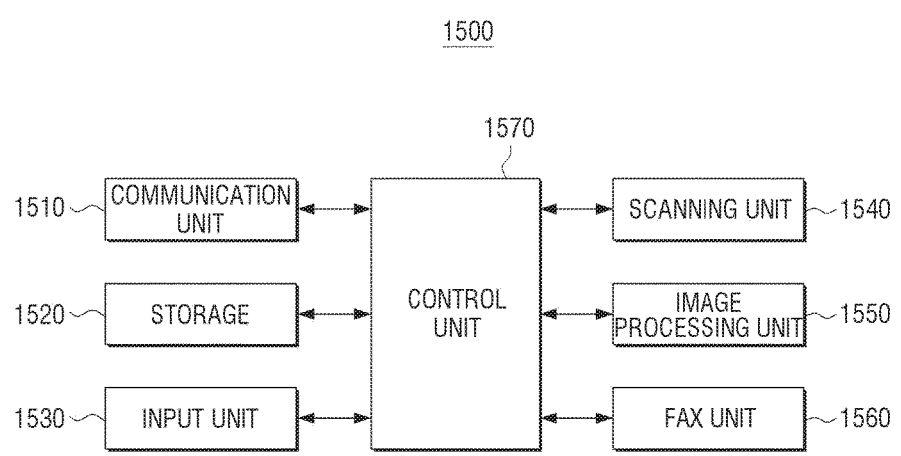
FIG. 15 is a black diagram provided to explain an image forming apparatus, according to another embodiment of the present disclosure.

FIG. 15 is a block diagram provided to explain an image forming apparatus according to another embodiment of the present disclosure.

Referring to FIG. 15, an image forming apparatus 1500 includes a communication unit 1510, a storage 1520, an input unit 1530, a scanning unit 1540, an image processing unit 1550, a fax unit 1560, and a control unit 1570.

The communication unit 1510 is formed to connect to another forming apparatus, which may be connected via local area network (LAN) and internet or may be connected via a universal serial bus (USB) port and a wireless module. Herein, the wireless module may be a WiFi, WiFi Direct, near field communication (NFC), Bluetooth, etc.

That is, the communication unit 1510 may transceive fax data with an external apparatus or another image forming apparatus. In addition, the communication unit 1510 may transmit a scanning option input from the input unit 1530 to another image forming apparatus, and may transmit a fax sending command with respect to as second document mounted in the other image forming apparatus to the other image forming apparatus.

The storage 1520 is a configuration which stores various programs or data required to drive the image forming apparatus 1500. For example, the storage 1520 may store fax data received from the fax unit 1560, and may store fax data which is image-processed in the image processing unit.

That is, the storage 1520 may store transmit terminal identification (TTI) information of the image forming apparatus 1500, and store TTI information received from other image forming apparatuses. The TTI information includes information on a fax sender, fax transmission time, etc., which may be indicated at the bottom of a paper in which fax information is output. The user may identify TTI information at the bottom of the paper to figure out information on a sender of the fax data. For example, the bottom of the page may include a fax number on the receiving side, a fax number on the sending side, fax receipt date, time, etc.

Further, the storage 1520 may store a fax contact list, spam fax number, etc. The spam fax number refers to a number of recipient from which the user does not wish to receive fax. The user may directly input a spam fax number in the image forming apparatus 1500, or may, when receiving fax, register the number of the sender as a spam fax number. According to an embodiment of the present disclosure, spam fax numbers registered in each of the image forming apparatus may be shared. For example, the image forming apparatus 1500 may receive a spam fax number from another image forming apparatus, and store the received number in the storage 1520. As another example, a spam fax number sharing server which stores a spam fax number registered in each image forming apparatus may be included.

The input unit 1530 includes a number of function keys in which a user may set or select various functions supported by the image forming apparatus 1500. The input unit 1530 may be realized as a device in which input and output are simultaneously realized, such as a touch screen, etc., and may be realized as a device generated from the combination of a mouse and a monitor.

Specifically, the input unit 1530 may receive a scanning option to be applied to a scan job from a user, and may receive a fax sending request with respect to a first document mounted in the image forming apparatus 1500 and a second document mounted in another image forming apparatus. In addition, the input unit 1530 may receive a fax recipient.

The input unit 1530 may be realized as a touch panel including a display, and may, if the input unit 1530 is realized as a touch pad, display a process for processing a scanning option input. For example, through the input unit 1530, a user may input a scanning option to be collectively applied to the image forming apparatus 1500 and another image forming apparatus, and may individually input a scanning option through a setting UI included in each of the image forming apparatuses.

The scanning unit 1540 may generate scanned data by scanning a document. Specifically, the scanning unit 1540 may generate scanned data according to the input scanning option. For example, the scanning unit 1540 may include a scan motor unit (not shown), a scanning unit (not shown) for scanning a document, and an image processing unit (not shown) for processing image data input from the scanning unit. In particular, the scanning unit 1540 may generate scanned data by scanning a document to be sent via fax according to a fax sending command.

The image processing unit 1550 may convert scanned data generated from the scanning unit 1540 into a fax image suitable for a fax transmission standard. Further, the image processing unit 1550 may combine TTI information to generate a fax image.

In addition, the image processing unit 1550 may perform image processing, such as a file format conversion of received fax data, decompression, etc. Fax data to which such image processing is performed may be stored in the storage 1520 as content.

Herein, the content is a file such as image data, text, HTML document and a file which may be directly-printed in an image forming apparatus, etc. The direct printing is a printing method where a print job may be performed by only transmitting the corresponding file to an image forming apparatus without further file conversion. Files that allow direct printing include JPG, PDF and XPS files.

The fax unit 1560 may receive fax data transmitted from an external device, or transmit fax data. For example, the fax unit 1560 may receive fax transmitted via a telephone network, or may transmit data within the image forming apparatus 1500 via a telephone network. The fax unit 1560 may also be connected via internet as well as telephone network.

Specifically, the fax unit 1560 may receive fax data from another image forming apparatus, as well as an external device, connected to the image forming apparatus 1500 via network, etc. In addition, the fax unit 1560 may be divided into a fax line which receives fax data from an external device and a fax line which receives fax data from another image forming apparatus connected to the image forming apparatus 1500. According to an embodiment, the image forming apparatus 1500 may be set with respect to each of the first fax line and the second fax line, and the first line is for outside line use, and the second fax line is for internal line use which receives fax data from another image forming apparatus connected to the image forming apparatus 1500. In this method, the same effect as the image forming apparatus supporting a dual fax line is achieved.

When the image forming apparatus 1500 has enough toner for printing fax data and the other image forming apparatus has not enough toner, the other image forming apparatus may, based on toner information thereof, retransmit fax data received in the image forming apparatus 1500. The image forming apparatus 1500 may receive the fax data via the second fax line for internal line use to output the fax data with enough toner.

If the other image forming apparatus does not support format conversion of fax data, the image forming apparatus 1500 which supports a format conversion function may re-receive fax data received in the other image forming apparatus via the second fax line to perform format conversion. As such, even an older version of image forming apparatus having only a fax sending and receiving function may be used as connected with a newer version of image forming apparatus.

The control unit 1570 controls the overall set of the image forming apparatus 1500. For example, the control unit 1570 may, when receiving a fax sending request with respect to a first document mounted in the image forming apparatus 1500 and a second document mounted in the other image forming apparatus, transmit, to the other image forming apparatus, a scanning option input from the input unit 1530 and a fax transmission command with respect to the second document.

The control unit 1570 may identify format information of fax data received from the other image forming apparatus to perform format conversion or to perform e-mail transmission or server transmission. According to an embodiment, the image forming apparatus 1500 stores device information of the other image forming apparatus, and may be set to automatically perform format conversion or e-mail transmission with respect to the received fax data.

In response to a fax sending request, the control unit 1570 may convert scanned data generated in the scanning unit 1540 into a signal of a fax-sendable format, and transmit the signal to a fax receipt node. According to an embodiment, the image forming apparatus 1500 may transmit its own TTI information to another image forming apparatus. By transmitting its own TTI information, the image forming apparatus may control the other image forming apparatus to transmit fax data including the TTI information of the other image forming apparatus. Thereby, a fax task is separately performed in a plurality of image forming apparatuses, increasing a job processing speed. Also, it may be recognized on the receiving side as if the fax data is transmitted from one image forming apparatus.

The embodiment as described above will be described in greater detail with reference to FIG. 16. Hereinafter, it will be described such that the image forming apparatus 1500 is the first image forming apparatus 1500 for convenience of explanation.

Figure 16:
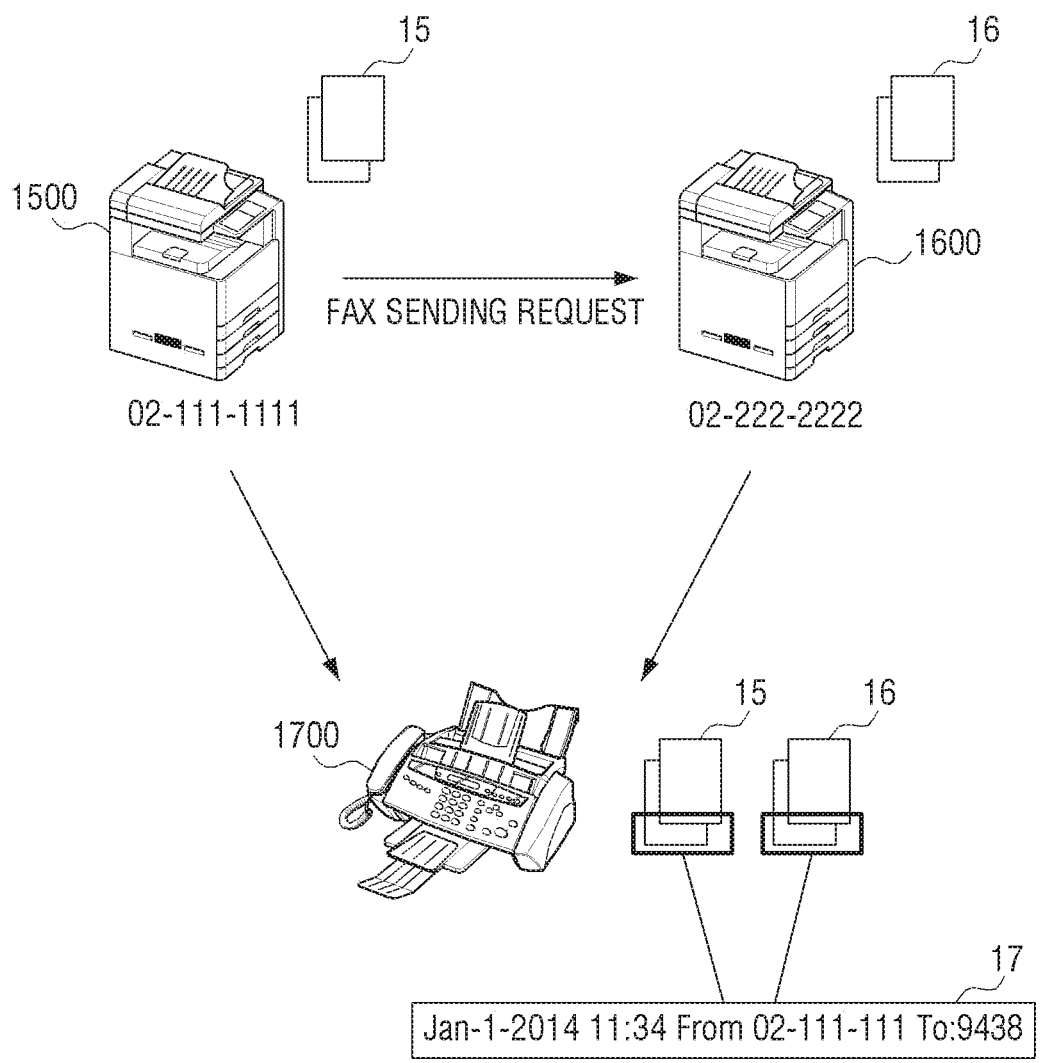
FIG. 16 illustrates a fax sending method of an image forming apparatus, according to an embodiment of the present disclosure.

Referring to FIG. 16, a first document 15 and a second document 16 may be separately processed in the first image forming apparatus 1500 and the second image forming apparatus 1600, respectively, converted into fax data, and transmitted to an external device 1700.

For example, a user may input, to the first image forming apparatus 1500, a scanning option with respect to the first document 15 and the second document 16 along with a fax sending request. Then, according to the input scanning option and fax sending request, the first image forming apparatus 1500 may generate first scanned data with respect to the first document 15. Then, the first image forming apparatus 1500 may convert the first scanned data into a signal of fax-sendable format, and transmit the signal to a fax receipt node of the external device 1700.

Likewise, when the scanning option and fax sending request input from the first image forming apparatus 1500 are transmitted to the second image forming apparatus 1600, the second image forming apparatus 1600 may generate second scanned data with respect to a second document according to the transmitted scanning option. Then, the second image forming apparatus 1600 may convert the generated second scanned data into a signal in the fax-sendable format, and transmit the signal to a fax receipt node of the external device 1700.

Meanwhile, the first image forming apparatus 1500 may transmit its own TTI information to the second image forming apparatus 1600. In this example, the second image forming apparatus 1600 fax data with respect to the second document including the transmitted TTI information of the first image forming apparatus 1600. That is, the external device 1700, substantially, receives fax data from each of the first image forming apparatus 1600 and the second image forming apparatus 1700; however, TTI information 17 included in a document output from the external device 1700 is TTI information 17 of the first image forming apparatus 1600.

According to the embodiments as described above, the external device 1700 may recognize as if fax data is processed in one recipient, but actually, the fax task is separately performed in both the first image forming apparatus 1500 and the second image forming apparatus 1600, thereby reducing work time compared with the case where the same task is conventionally performed in one device.

According to another embodiment, fax data received from the second image forming apparatus 1600 and fax data received from the first image forming apparatus 1600 may be managed in one device. For example, when the second image forming apparatus 1600 only supports a fax sending and receiving function, fax data received from the second image forming apparatus 1600 may be set to be automatically forwarded to the first image forming apparatus 1500. Then, the first image forming apparatus 1500 may receive the fax data from the second image forming apparatus 1600, output it, and record a log.

Therefore, the first image forming apparatus 1500 may be managed as if it were supporting a dual fax line, using its own fax line and a fax line of the second image forming apparatus 1600. That is, it may be managed such that the second image forming apparatus 1600 is for receiving only, and that the first image forming apparatus 1500 is for receiving and managing fax data received from the first and second image forming apparatuses 1500, 1600. For example, in companies and public offices, it may be managed such that the first image forming apparatus 1500 is for internal line use, and that the second image forming apparatus 1600 is for external line use, thereby efficiently managing each of the image forming apparatuses in terms of use.

Figure 17:
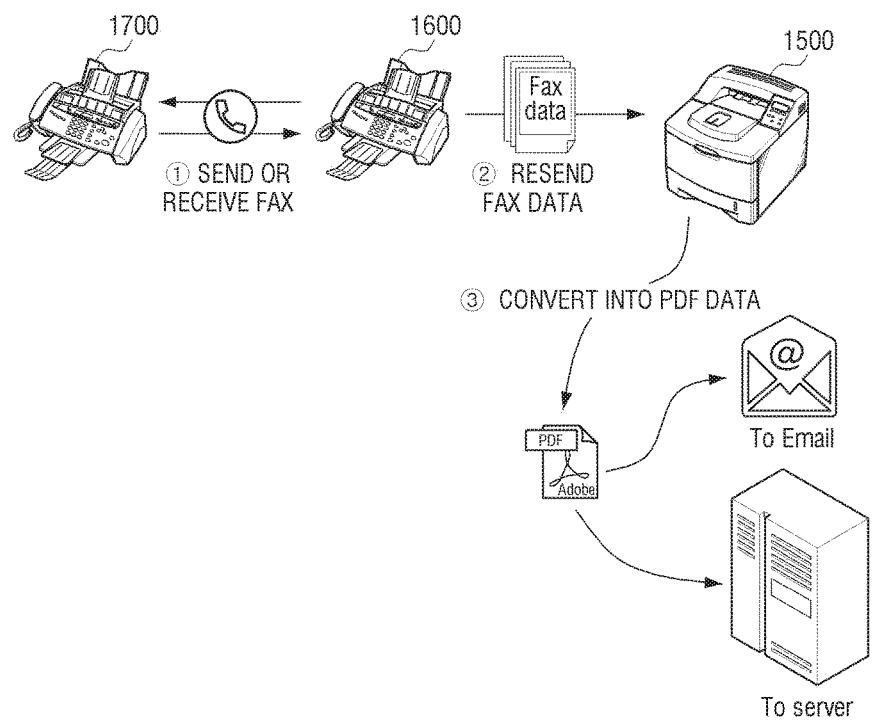
FIG. 17 illustrates a method for processing fax data, according to an embodiment of the present disclosure.

Referring to FIG. 17, in the case where the second image forming apparatus 1600 which does not support a format conversion function receives fax data from the external device 1700, when it is necessary that the received fax data be converted to another format, the second image forming apparatus 1600 may transmit the fax data to the first image forming apparatus 1500. The first image forming apparatus 1500 may convert a format of fax data received from the second image forming apparatus 1600 to store the fax data, or may transmit the fax data to another server device or e-mail.

For example, the first image forming apparatus 1500 may be set to, with respect to fax data received from the second image forming apparatus 1600, automatically convert the fax data to a PDF file, and then apply forward to e-mail and forward to server functions. It is described with reference to FIG. 17 that fax data is converted into a PDF file for convenience of explanation; however, the present embodiment may be applied without limitation to any case where the first image forming apparatus 1500 is to perform a function that is not supported by the second image forming apparatus 1600.

For example, when only the first image forming apparatus 1500 supports a security fax function, for example, when it is supported such that fax data is output only when a password is input, fax data received from the second image forming apparatus 1600 may use such security fax function of the first image forming apparatus 1500.

As another example, the first image forming apparatus 1500 may manage fax data directly received in the image forming apparatus 1500 from an external source and fax data received from the second image forming apparatus 1600 in separate spaces. In this example, it may be set such that a fax security is not applied to fax data received via fax line for internal use (data received from the second image forming apparatus 1600), and such that fax data directly received from an external source is output only when a password is input, and vice versa. Further, a user may also select a security fax function to be applied to all fax data.

According to the above-described embodiment, even when the second image forming apparatus 1600 does not support a particular function, the first image forming apparatus 1500 which supports that function may be used, and thereby the second image forming apparatus 1600 which has not been used for being an older version may be made use of.

According to another embodiment of the present disclosure, the first image forming apparatus 1500 and the second image forming apparatus 1600 may share a fax spam number registered in each of them. For example, the storage 1520 of the first image forming apparatus 1500 may store a spam fax number registered in the second image forming apparatus 1600 as well as that registered in the first image forming apparatus 1500. Also, the storage of the second image forming apparatus 1600 may store a spam fax number registered in the first image forming apparatus 1500. For example, the first image forming apparatus 1500 and the second image forming apparatus 1600 may communicate with each other regularly to exchange spam fax numbers.

In this case, when the first image forming apparatus 1500 receives a receipt request from a spam fax number registered in the second image forming apparatus 1600, the control unit 1570 of the first image forming apparatus 1500 may refuse to receive the fax based on spam fax number database of the storage 1520. As such, a spam fax number may be shared in a storage of either the first or second image forming apparatus, or may be stored in a separate shared server.

Figure 18:
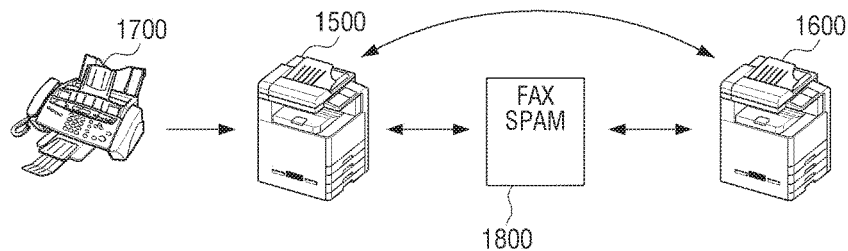
FIG. 18 illustrates a method for receiving fax data, according to an embodiment of the present disclosure.

FIG. 18 is a view provided to explain a shared server for sharing a spam fax number according to an embodiment of the present disclosure. Referring to FIG. 18, a fax spam number registered in the first image forming apparatus 1500 and that registered in the second image forming apparatus 1600 may be registered in a spam number shared server 1800.

For example, the control unit 1570 of the first image forming apparatus 1500 may reject fax receipt when the fax is received from a number that is identical to a spam number registered in the spam number shared server 1800.

For example, a fax spam number registered in each of the image forming apparatus 1500 and the second image forming apparatus 1600 may be automatically uploaded to the spam number shared server 1800. Thereafter, fax data is received in the first image forming apparatus 1500 from a particular number and the particular number is a spam number registered in the second image forming apparatus 1600, the control unit 1570 of the first image forming apparatus 1500 may communicate with the spam number shared server 1800 to reject receipt of that fax data.

It is described in the above various embodiments that an image forming apparatus among a plurality of image forming apparatuses is an apparatus which collectively receives a scanning option; however, according to another embodiment, a user terminal apparatus (not shown) may receive a job command or a scanning option. In this case, the user terminal apparatus may communicate with a plurality of image forming apparatuses, and a scan command, a copy command, a fax command and a scanning option received through the terminal apparatus may be transmitted to each of the image forming apparatuses.

In this example, the user may retrieve an image forming apparatus that may be connected with the user terminal apparatus using a communication method supported by the user image forming apparatus. For example, if the user terminal apparatus supports Wi-Fi, the user terminal apparatus may retrieve an image forming apparatus which may be connected via Wi-Fi, and if the user terminal apparatus supports Wi-Fi and NFC, it may retrieve an image forming apparatus which may be connected via each of the connection methods.

Further, the user terminal apparatus may receive device information of the retrieved image forming apparatus or a selected image forming apparatus. In this example, the device information may include address information (IP address, MAC information, which is required for connection with the image forming apparatus), functional information (information on functions supported by the image forming apparatus, such as whether color printing is available, whether scanning is available, etc.) and state information (whether it may perform a job now, whether an error has occurred, work progress, etc.).

In addition, the user terminal apparatus may receive, from a particular image forming apparatus, a UI for receiving a job command and a scanning option. Further, the user terminal apparatus may generate a UI by itself using the received device information on the image forming apparatus. Also, the job command and scanning option received through a UI may be transmitted to each of the image forming apparatuses.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

The invention claimed is:

1. An image forming apparatus, comprising:
an input panel to:
receive a command to perform a scanning operation, and
receive a selection of a scanning option;
a communication chip to transmit the command to perform the scanning operation, the selected scanning option, and state information of the image forming apparatus to another image forming apparatus;
a scanner to:
based on the command to perform the scanning operation, scan a first document according to the scanning option and the state information of the image forming apparatus, and
generate first scanned data; and
at least one processor to:
receive, from said another image forming apparatus, second scanned data corresponding to a second document, and
combine the first scanned data and the second scanned data,
wherein, based on the command to perform the scanning operation, the second document is scanned by said another image forming apparatus according to the scanning option and the state information transmitted by the communication chip.

2. The apparatus as claimed in claim 1, wherein the at least one processor:
aligns the first scanned data and the second scanned data according to a predetermined priority, and
combines the aligned first scanned data and second scanned data.

3. The apparatus as claimed in claim 1, wherein the at least one processor:
converts the first scanned data and the second scanned data to a first scanned image and a second scanned image, respectively,
detects a page number indicated in each of the first and second scanned images, and
aligns, according to an order of the page number, the first scanned data and the second scanned data and combines the aligned first and second scanned data.

4. The apparatus as claimed in claim 1, further comprising:
a printer to output the combined first and second scanned data on a paper.

5. The apparatus as claimed in claim 1, further comprising:
a display to display a list of image forming apparatuses connected to the image forming apparatus via a network,
wherein said another image forming apparatus is selectable from the list.

6. The apparatus as claimed in claim 1, wherein the at least one processor:
in response to the scanning option being individually set with respect to the first document and the second document, transmits a scanning option set with respect to the second document to said another image forming apparatus, and
in response to the scanning option being collectively set with respect to the first document and the second document, transmits all of the received scanning option to said another image forming apparatus.

7. The apparatus as claimed in claim 1, wherein the state information comprises at least one of color temperature information of an image scanned in the image forming apparatus or color characteristics information of an image printed in the image forming apparatus.

8. The apparatus as claimed in claim 1, wherein the at least one processor, in response to receiving a fax sending request with respect to the first document and the second document, transmits, to said another image forming apparatus, the scanning option and a fax sending command with respect to the second document.

9. The apparatus as claimed in claim 8, wherein the at least one processor:
   in response to the fax sending request,
      converts the first scanned data into a signal of a format that is sendable via fax,
      transmits the signal to a fax receipt node, and
      transmits transmit terminal identification (TTI) information of the image forming apparatus to said another image forming apparatus.

10. The apparatus as claimed in claim 1, further comprising:
   a memory to store a spam number registered in the image forming apparatus and said another image forming apparatus,
   wherein the at least one processor, in response to receiving a fax received from a number that is identical to a spam number stored in the memory, rejects a fax receipt.

11. A scanning method of an image forming apparatus, the method comprising:
   receiving a command to perform a scanning operation;
   receiving a selection of a scanning option;
   based on the command to perform the scanning operation, generating first scanned data by scanning a first document according to the scanning option and state information of the image forming apparatus;
   transmitting the command to perform the scanning operation, the selected scanning option, and the state information of the image forming apparatus to another image forming apparatus;
   receiving, from said another image forming apparatus, second scanned data corresponding to a second document; and
   combining the first scanned data and the second scanned data,
   wherein, based on the command to perform the scanning operation, the second document is scanned by said another image forming apparatus according to the scanning option and the state information transmitted by the image forming apparatus.

12. The method as claimed in claim 11, wherein the combining comprises:
   converting the first scanned data and the second scanned data into a first scanned image and a second scanned image, respectively;
   detecting a page number indicated in each of the first and second scanned images; and
   according to an order of the page number, aligning the first scanned data and the second scanned data and combining the aligned first and second scanned data.

13. The method as claimed in claim 11, wherein the transmitting of the received scanning option to said another image forming apparatus comprises:
   in response to the scanning option being individually set with respect to the first document and the second document, transmitting, to said another image forming apparatus, a scanning option set with respect to the second document, and
   in response to the scanning option being collectively set with respect to the first document and the second document, transmitting all of the received scanning option to said another image forming apparatus.

14. The method as claimed in claim 11, wherein the transmitting of the scanning option to said another image forming apparatus comprises, in response to a fax sending request with respect to the first document and the second document being received, transmitting, to said another image forming apparatus, the scanning option and a fax sending command with respect to the second document.

* * * * *